(12) United States Patent
Kendi et al.

(10) Patent No.: US 9,436,541 B2
(45) Date of Patent: Sep. 6, 2016

(54) METHODS OF IMPLEMENTING A DYNAMIC SERVICE-EVENT MANAGEMENT SYSTEM

(71) Applicant: KNI MUSZAKI TANACSADO KFT., Budapest (HU)

(72) Inventors: Zsolt Kendi, Budapest (HU); Istvan Paroczai, Budapest (HU)

(73) Assignee: KNI Muszaki Tanacsado Kft., Budapest (HU)

( * ) Notice: Subject to any disclaimer, the term of this patent is extended or adjusted under 35 U.S.C. 154(b) by 77 days.

(21) Appl. No.: 14/577,107

(22) Filed: Dec. 19, 2014

(65) Prior Publication Data

US 2015/0127988 A1 May 7, 2015

Related U.S. Application Data

(63) Continuation-in-part of application No. PCT/IB2012/053227, filed on Jun. 26, 2012.

(51) Int. Cl.
*G06F 11/07* (2006.01)
*H04L 12/24* (2006.01)

(52) U.S. Cl.
CPC ......... *G06F 11/079* (2013.01); *G06F 11/0709* (2013.01); *H04L 41/065* (2013.01); *H04L 41/5035* (2013.01)

(58) Field of Classification Search
CPC .................... G06F 11/079; G06F 11/0709
See application file for complete search history.

(56) References Cited

U.S. PATENT DOCUMENTS

| 6,012,152 A * | 1/2000 | Douik ................ G06F 11/0709 714/26 |
| 2006/0047721 A1* | 3/2006 | Narang ............. G06F 17/30575 |
| 2009/0182868 A1* | 7/2009 | McFate ................ G06F 9/5027 709/224 |
| 2011/0264956 A1* | 10/2011 | Ito ....................... G06F 11/0748 714/20 |

* cited by examiner

*Primary Examiner* — Jigar Patel
(74) *Attorney, Agent, or Firm* — Olson & Cepuritis, Ltd.

(57) ABSTRACT

Dynamic service-event management methods to implement a dynamic service-event management system. Generally applicable in fields of utility, telecommunication and financial service providers. Therein, events has affect to status or quality of service projecting to service in two steps and using common-format events. In first step, external source originated events (11, 21, 24) are converted in network parser module(s) (1, 2) to a common event-format. In second step, the common format events (12, 22) are processed and their information projected to a service in a service parser module (3). The resulting common format service-event (31) and network events (13, 23) are stored by an alert parser module (4). The stored events are accessible for other connected systems through a database based application programming interface (41). Opening times are effectively handled using opening events (61). A bearer-to-beared object assignment can be handled in two ways. In the easiest solution information originated from an event source is used. Another possible solution uses a static database which is maintained by a database parser module (5). The static database is accessible for other connected systems through a database based application programming interface (51).

9 Claims, 28 Drawing Sheets

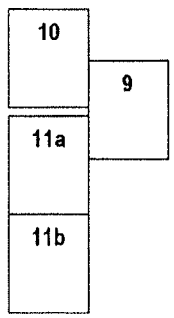
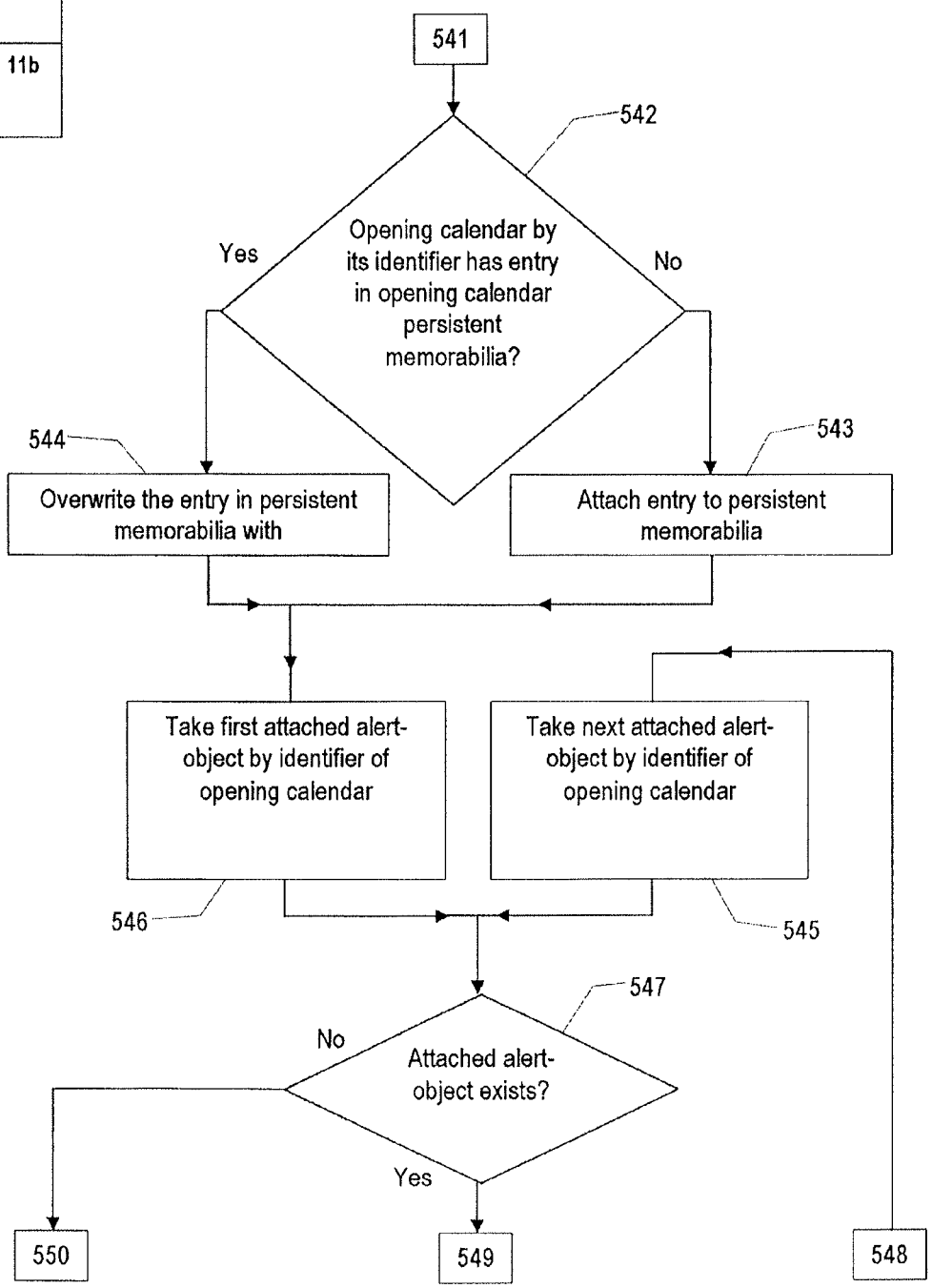
Fig. 11
Fig. 11a

METHODS OF IMPLEMENTING A DYNAMIC SERVICE-EVENT MANAGEMENT SYSTEM

CROSS-REFERENCE TO RELATED APPLICATIONS

This application is a continuation-in-part of PCT/IB2012/053227, filed Jun. 26, 2012, which claims priority of Hungarian Patent Application No. P1200384, filed Jun. 25, 2012, each of which is incorporated herein by reference.

BACKGROUND

1. Field of the Invention

The present invention relates to supervising services and, more particularly, to methods for implementing a dynamic service-event management system, covering mostly supervise services of utility, telecommunication and financial service provider networks.

In the XXI. century all areas of common life are interwoven by services such as utility and financial services, including e.g. gas, water, sewer, electricity and telecommunication services. Meanwhile, demands of customers are increasing for flawless high-quality service. Another aim to fulfil is the growing liability for service providers because of increasing complexity of devices used for providing services and large number of users. Liability is growing because the number of incoming monitored events is extremely large and heterogeneous. Services may be affected by e.g. a broken pipe, a broken wire, actual gas calorific values, PH value of water, a solar flare, a foreign exchange price or just a sick customer service staff. Therefore continuous monitoring of service quality can only be possible with help of sophisticated mechanised systems.

2. Problem to be Solved

Basically, real-time monitoring of service status and quality of service provider networks. Detecting, indicating and documenting/logging probable failure causes or deteriorations in real-time. Intervention to restore or improve the quality of service functionality based on result of analysis. Furthermore, unified handling of different types of interweaving or parallel provider networks.

For example, consider a small village as a simplistic example for task to be solved. This has its own electric power plant and every consumer has smart metering means. Using information of this two event source types and hundreds of event sources we got continuous and accurate reports of status and quality of every service.

However, the village's water supply pumps can also work with electricity. Therefore the electrical system failure can also affect water supply.

In addition, the gas pressure regulators use electric current too. Thus, errors occurring in the electrical service can affect the supply of gas.

But of course, the settlement has telecommunication infrastructure. Said electrical system failure can also affect telecommunication services.

And finally, the small village has a bank office. If any power failure occurred, the bank office will get closed and this can deteriorate the quality of financial service.

Again emphasised, this is a very simple example. To understand the real task, the supervised area should be extended to a small town, to a big city, to a county, to a country or to a continent. In such a case, we are talking about not just one but many different types of power plant which are linked through a complicated network of pipes and lines and connected through to consumers. Interweaving networks (such as water, gas) are inhomogeneous and complicated themselves, and contains backup paths. Moreover, in practice, many other problems characterise and affect these networks.

Should the task be expressed using a mathematical formula then its complexity is twice of the sum of the complexity of covered service provider networks, and the knowledge necessary to construct at least as much as the amount of knowledge used to build service networks.

3. State of the Art

To understand state of art it is important to emphasize the difference between a standard event correlation and root failure cause analyser systems, and a service oriented event correlation and root failure cause analyser systems. For a standard system any method can provide adequate result. Accordingly, many standard solutions are known, such as the solutions disclosed e.g. in U.S. Pat. No. 5,761,502, U.S. Pat. No. 7,730,494, US 2010325493, US 2006/0095815, US 2008/0181099, US 2008/0298229, US 2010/0050023, US 2010/0157812, US 2010/0287361, US 2010/0223628, U.S. Pat. No. 7,401,264, US 2008/0046266. In contrary, service oriented systems and methods are useful in practice only if common denominator of different technologies are defined and handled, and have proper features to handle events in a shared architecture. The common denominator is a precondition for unified handling of dissimilar bearer technologies. The shared architecture needed for efficient handling of numerous bearer technologies and events.

Solutions closest to the methods according to several aspects of the invention are published by the organisation ITU-T for telecommunication sector as recommendations. However this recommendations do not provide realizable solution for practice, just provide the standardization. For example, US 2002/0022952 disclose attempts to upgrade the subject recommendations.

Recommendation X.200 defines interwork between various entities, defines the conception of services and service access points. Recommendation X.701 defines a general management conception. Recommendation X.710 defines a kind of common event format, recommendation Q812 defines its content, and the recommendation X.711 defines its processing method. Recommendation X.720 define common event types, recommendation X.721 defines its content. Recommendation X.722 defines conception of managed objects representing event sources; recommendation X.723 defines their recommended attributes. Recommendation X.725 defines relations between objects. Recommendation X.730 defines usage of a managed object for management systems. Recommendation X.731 defines possible states of the object. Recommendation X.732 defines usage of object relations for management systems. Recommendation X.733 defines a method of alert generation and its content. Recommendation X.734 defines a method of forwarding events to partner systems. Recommendation X.735 and X.754 define event logging functions. Recommendation X.744 defines software as managed object. Recommendation X.790 defines trouble ticket handling; recommendation X.791 defines its storage and query.

Recommendation M.3060 transforms these recommendations to service-oriented architecture (SOA) for the next generation networks (NGN). Recommendation M.3010 defines interfaces between. Recommendation Y.2011 defines integrity of multi-layered networks; the recommendation G.7718 defines integrity of complementary networks. Recommendation M.3050 define co-operation with partner networks.

Service event correlation and service management is also employed in the field of IT and telecommunication as discussed for example in ANDREAS HANEMANN et al.: "Assured Service Quality by Improved Fault Management, Service-Oriented Event Correlation", ACM, 2 PENN PLAZA, SUITE 701-NEW YORK, USA, 19 Nov. 2004, XP040012727; as well as in VITALIAN A CANIU et al.: "Declarative Specification of Service Management Attributes", INTEGRATED NETWORK MANAGEMENT, 2007. IM '07. 10th IFIP/IEEE INTERNATIONAL SYMPOSIUM ON, IEEE, PI, 1 May 2007, pages 429-438, XP031182717, ISBN: 978-1-4244-0798-9. Even these publications do not provide adequate description of complex heterogeneous systems.

In summary, relating known systems and inventions are basically divided into four groups. First and oldest group is built by network management systems focused to root failure cause analysis. The second group contains enterprise resource planning systems (ERP) focused to static event handling. The third group contains the completely abstract unaccomplishable publications. The fourth group contains a system without common structure composed by many different products. Common characteristic of said groups does not offer a comprehensive and workable solution on an industrial scale.

In view of the above, there is a need for methods for providing universal and common solutions. In other words, just at the phase of a customer specific implementation is required to be aware of structures and particular processing methods of incoming and outgoing events.

SUMMARY OF THE INVENTION

The present invention relates to systematized methods required for building of dynamic service-event management systems. Using easy to understand mathematical simile, the methods are shapes of reductions or common denominators. The methods belong to the group of service orientated event correlation and root failure cause analyser systems.

According to a first aspect of the invention the task outlined above has been solved by a method of implementing a dynamic service-event management system which comprises the steps:

describing assigned service by describing the position of an event source within bearers of the service as a two-dimensional route description, wherein a route constitutes the first dimension and an element within the route constitutes the second dimension, or as a three-dimensional route description, wherein a route constitutes the first dimension, an element within the route constitutes the second dimension and the bearer of the element within the route constitutes the third dimension;

projecting of one or more events affecting status and/or quality of a service onto said service in two steps by using a common-format event type, in the first step, converting an event (11, 21, 24) originating from an external source in a network parser module (1, 2) to a common-format event including an identifier of the source of the incoming event (11, 21, 24) as an event source identifier, a status generated by the incoming event information as a status, an operational status generated by an incoming event information expressed in percentage, an identifier of the incoming event source as a failure cause expressed in common-format, in the second step, by processing the resulting common-format event (12, 22) in a service parser module (3), where the common-format event comprising the event source identifier, the status carried by the event, the number defining the operational status expressed in percentage, the failure causes expressed in common-format;

obtaining assigned service and the position of the event source within the bearers of the service from the event source identifier with the aid of the two-dimensional or three-dimensional route description between bearers of the service;

projecting the information carried by the common-format event (12, 22) onto said service by determining a number of operational routes based on the received common-format event (12, 22) and stored status of the bearers of the service, then based on the above;

deciding the status of service is operational if there is an operational route, else deciding the status of service is faulty;

determining the operational status of the service expressed as a numerical ratio of operational routes and faulty routes in percentage;

determining that the failure cause of the service are the failure causes of faulty routes, storing the common-format event (12, 22) comprising actual status of bearer in a memorabilia.

A preferred implementation of the method comprises further steps of performing of a function "failure cause of a failure cause" by using a common-format event in such a way that, if the alert-object being not the failure cause per se just affected to, then indicating the real failure cause object and the alert-object in a multi element failure cause variable of the common-format event and obtaining relationships between the network objects from the event source identifier.

A further preferred implementation of the method comprises the further step of persistently storing of common-format events for e.g. retrieval or processing.

A further preferred implementation of the method comprises the further step of making the data of persistently stored common-format events and the static database comprising assign-to-service and assign-to-network information available for other connected systems via a database based application programming interface (API), wherein said bidirectional interface is represented by a command database table and a response database table, and further comprising for issuing a command, entering one line in the command database and transmitting the command, monitoring, receiving, interpreting and executing the command, sending a response through said response database table, wherein the formats of command and response are defined by the respective database table.

According to a second aspect of the invention the task outlined above had been solved by assignment-retrieval with the aid of a static database comprising all alert-objects affecting the service and defining the interrelations in a table.

A preferred implementation of the method comprises further steps of handling of predefined opening hours by an opening calendar, creating a common opening calendar for alert-objects having same opening hours, monitoring the calendar and at opening hour changes sending a related opening event to related parser modules and effectuating the changes to related alert-objects.

Another preferred implementation of the method comprises the further step of performing of a function "failure cause of a failure cause" by using a common-format event in such a way that, if the alert-object being not the failure cause per se just affected to, then indicating the real failure cause object and the alert-object in a multi element failure cause variable of the common-format event and obtaining relationships between the network objects from a static database containing all alert-objects affecting each other.

A yet another preferred implementation of the method comprises the further step of persistently storing of common-format events for e.g. retrieval or processing.

Another preferred implementation of the method comprises the further step of making available the data of persistently stored common-format events and the static database comprising assign-to-service and assign-to-network information for other connected systems via a database based application programming interface (API), wherein said bidirectional interface is represented by a command database table and a response database table, and further comprising for issuing a command, entering one line in the command database and transmitting the command, monitoring, receiving, interpreting and executing the command, sending a response through said response database table, wherein the formats of command and response are defined by the respective database table.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 11 is an overview showing interconnection of the parts shown in FIGS. 9, 10, 11a and 11b.

FIGS. 11a and 11b show a flowchart of an opening event handler algorithm of the alert parser module.

FIG. 13 is an overview of the FIGS. 13a to 13d.

DETAILED DESCRIPTION OF THE INVENTION

The method according to the invention relies on the framework of the known ITU-T recommendations describing the closest solution. The invention is based on the recognition that services, field of application and resource requirement of ITU-T conception are subject to improvements. This, however, requires new methods and inventions. In other words, the present invention covers essential extensions effecting a faster, easy to develop, more functional system having broader field of application.

The present method handles services uniformly in a service-orientated architecture, independently from current network type and technology, and projects dynamic service-events onto said architecture. According to an aspect of the invention the effects of incoming non service-type events will be projected in two steps to services. In a first step a non service-type event will be converted in technology dependent manner to a common event type. In a second step effects will be projected from one common event type to a particular service.

Figure 1:
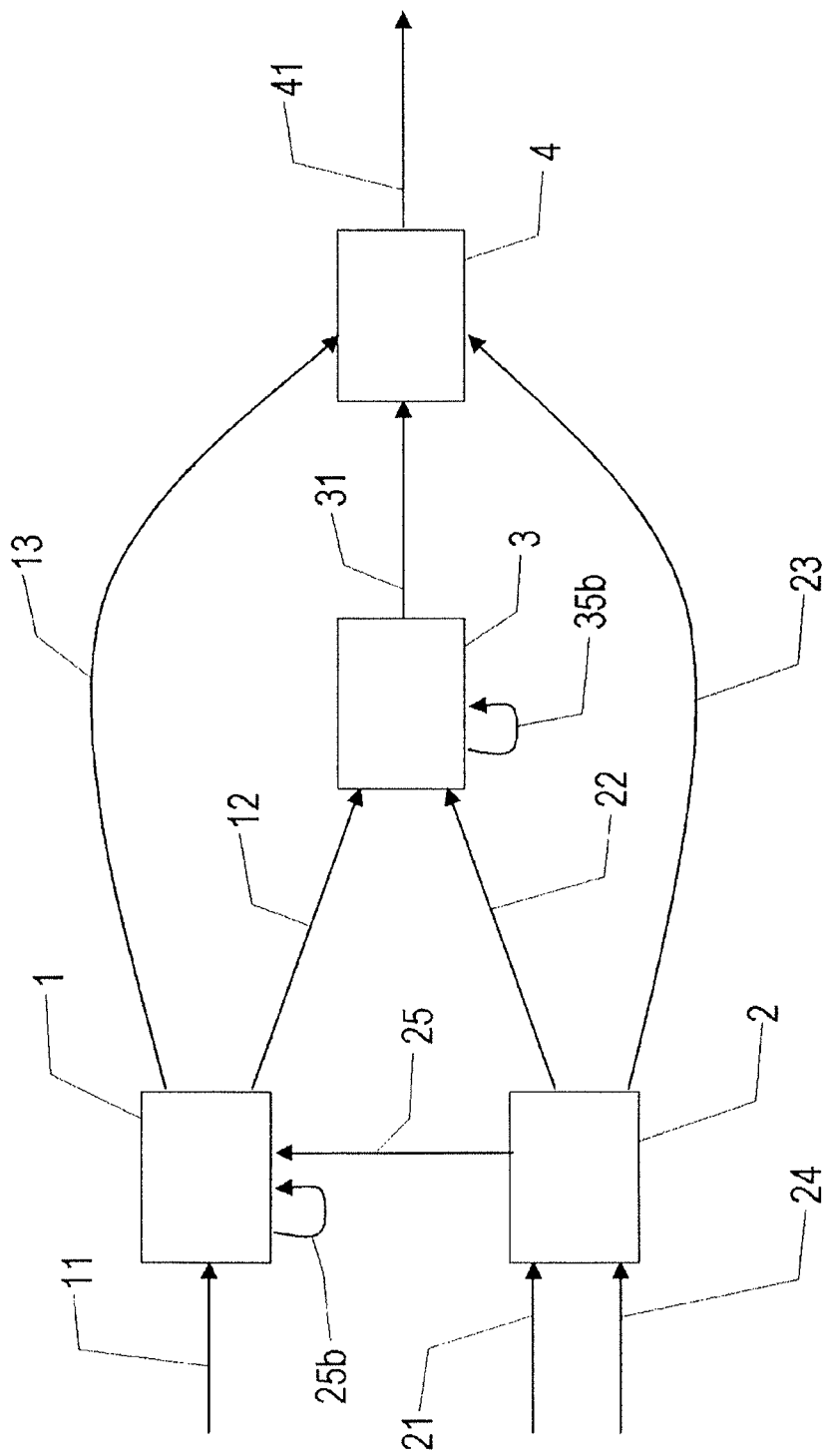
FIG. 1 is a view showing a typical implementation configuration case where incoming events carry assignment information.
Figure 2:
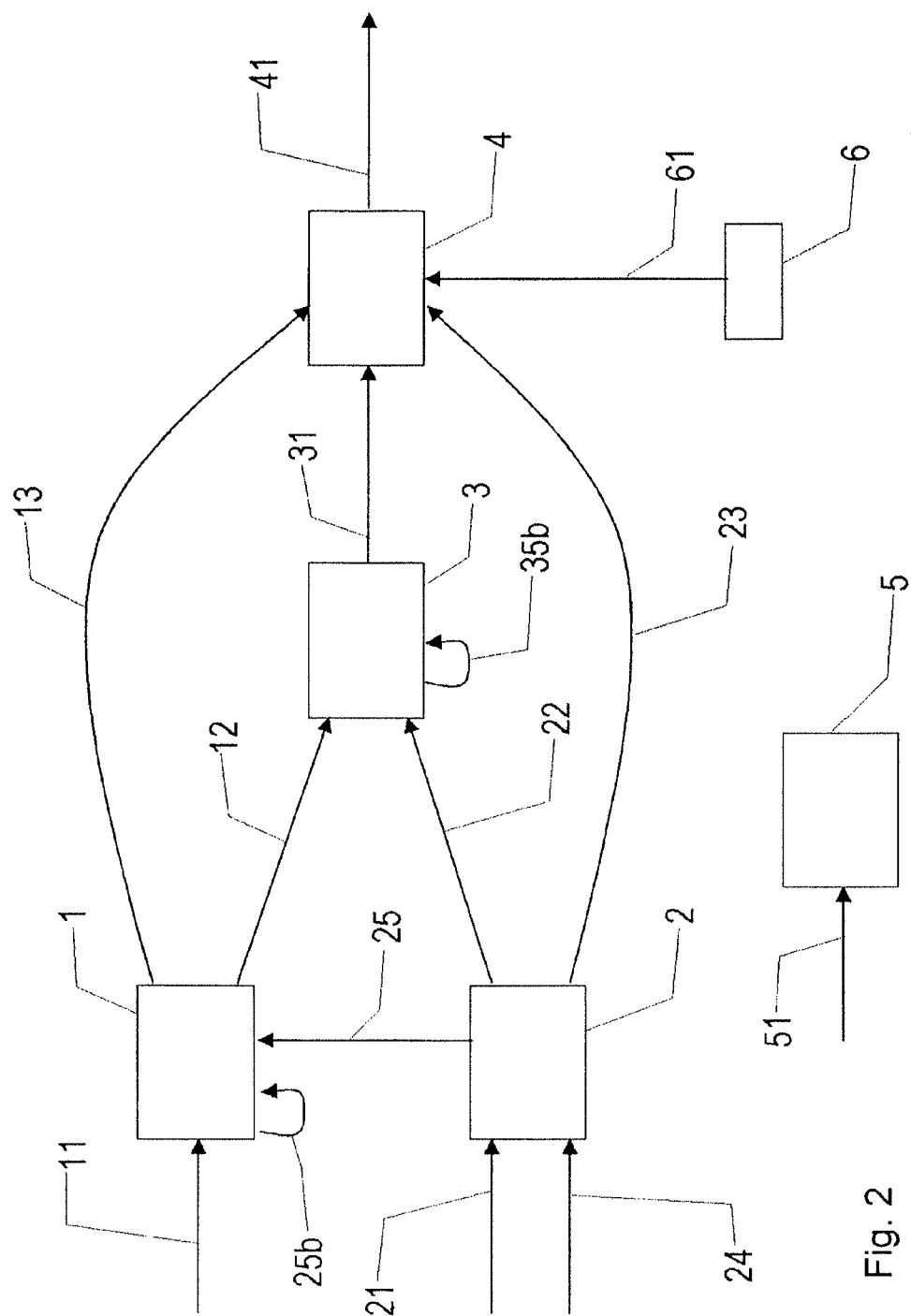
FIG. 2 is a view showing a typical implementation configuration case where incoming events do not carry any assignment information.

FIGS. 1 and 2 depict a modular system highly extensible by handler modules according to event types.

Considering the structure FIGS. 1 and 2 show configurations comprising so called parser modules. According to their function the modules can be grouped to network parser modules, service parser modules and serving parser modules.

A network parser module is technology dependent. In other words, the operation depends on type of device receives events from, and type of events. Its basic task is converting incoming technology-dependent non-service type events to a common event type and forward it to one or more parser modules. A system includes at least one such module. A module may receive events from one or more event source type or event source. Depending on implementation the parser module may have a function to suppress events causing no change, for example duplicated events.

A service parser module is technology independent. In other words, its operation is the same for events arrived from anywhere. Its basic task is to project effects of incoming events to a service, and forward it to parser module or modules. A system includes at least one such module. A module may receive events from one or more event source. Depending on implementation the parser module may have a function to suppress events causing no change, for example duplicated events.

The task of serving parser modules includes storing events, serving event recalling requests, maintaining a static database and serving database maintenance requests.

Additional Problems of the Implementation

A problem arising during implementing a system is how to create accurate and authentic long time memories of the events, which could help to retrieve events and its context. One of the great advantages of the present invention is that said problem can be solved easily and effectively by storing common-format events.

A further problem arising during implementing a system is how to share functions and data with external systems. Present system offers a database-based application programming interface (API) to solve this problem. Here a bi-directional interface is represented by two database tables. One of the tables is a command database table and other is a response database table. To issue a command a requester has to enter a table row to the command table. The responder monitors, interprets and executes the command and finally responds via the response database table. Formats of the tables define the formats of commands and responses. The two tables not necessarily have the same format.

It is preferred to define at least one unique identification number helping in determining togetherness. Implementation can be possible for example through an SQL database.

A further problem arising during implementing a system is how to describe assign-to-service information. The present invention offers two solutions, a method of a two-dimensional route description and a method of a three-dimensional route description. In case of two-dimensional route description shown in FIG. 3 the location of an event source within bearers of service is described as a two-dimensional reference, wherein the first dimension is the route, the second dimension is an element within the route. In case of three-dimensional route description shown in FIG. 4 the location of an event source within bearers of service is described as a three-dimensional reference, wherein the first dimension is the route, the second dimension is an element within the route and the third dimension is the bearer of the element within the route. In above description a set of dimensions means maximum number of dimensions. Therefore, for example depending on topology and availability of information, a three-dimensional reference can contain two-dimensional or one-dimensional description.

Figure 6:
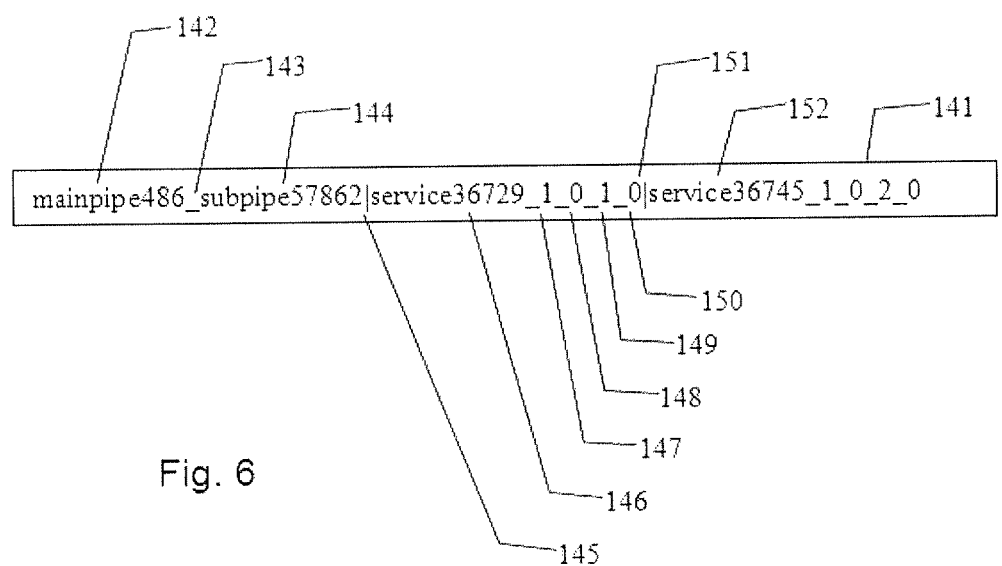
FIG. 6 is a view showing a naming example for network object identification carrying assignment information.

A further problem arising during implementing a system is how to retrieve assign-to-service information. One possible solution is where the event source is already known and the incoming event carries this information. This means for example information located in the identifier as shown in FIG. 6 or information located in a separate information field. In practice most systems use proprietary methods to generate identifications; in such cases this method is not applicable.

A further problem arising during implementing a system is how to retrieve assign-to-service information. If the incoming event does not carry this information one possible solution is retrieval of assignment with help of a static database. The static database must contain all service affected alert-object, and must describe the relationships between them. Relationships between objects can be described e.g. according to the method disclosed in the ITU-T Recommendation X.725 or according to the method described later in the chapter "One exemplary embodiment".

A further problem arising during implementing a system is how to handle "opening hours". In case of services, out of opening hours events can occur, which at this time span does not mean any error condition. A typical example is the turning off the power in a building for after-hours, and pretend failure of service bearer network layer. Solution for this problem is monitoring opening hours. But this is not an easy task because the huge resource needs. So the real solution is to consolidate same opening hours to an opening calendar, making it much less object to work with. At changes in the opening hour only one dedicated opening calendar change will occur and will be sent as an event to all alert-objects having same opening hours. The opening calendar to alert-object assignment can be retrieved from relations of the static database. Thus, theory and practical experience has shown that eventuate to considerable resource savings.

A further problem arising during implementing a system is how to share dynamic data of alert-objects among parser modules. In case of minor numbers of objects this can be done by an ordinary database sharing. However, where a large number of objects constitute an initial condition and high speed is also required, this way is not passable. Present system recommends an alert-objects owner parser module method to solve this problem.

According to this, the analysis should be structured so that an alert-object will be handled by only one parser module. In other words, just the owner parser module has access to dynamic data of alert-object, having the valid data. Is exceptionally an access by other parser module also needed, this request shall be fulfilled with an event sent to the owner parser module. A further advantage of said operation is the assistance in steering events among modules based on principle of ownership.

A further problem arising during implementing a system is the problem of "failure cause of failure cause". Indicating an own alarm state by an alert-object is not necessarily an own fault, it is possible as well that the alert-object is not the failure cause just a victim of a faulty condition. A good example is when a module of the device fails, but the service itself is borne by a dedicated connection unit of module. In this case, so-called root failure cause analysis helps to find the real source of failure (probable failure cause).

However, only to find the failure cause is insufficient, the information has to be stored and forwarded. The present invention preserves a multi-element variable in common-format event. For the example above, said variable will indicate the connection unit of module and will indicate the module as a primary failure cause. Using this method all information will reach completely the service and storage levels. This information can later be used for analysis and response query.

In present system the status of service and the failure cause is known, and the bearer structure is exactly described in the static database. Using this information it is possible to intervening by the system in technology-dependent manner to repair the failure or degradation of the service. An example for it is the so-called cold backup is defined for bearers of the service. If the on-line bearer fails, then the system will be able to activate the cold backup and restore the service. Another possible example is the so-called truncation. In case of a network overload the bearer is able, based on owned information, to switch off lower priority services and restore the operation of higher priority services.

Definitions

The phrase 'service' means a service provided by a service provider for users. The phrase 'user' relates inter alia to the user's own employees or other companies.

The phrase 'event' means any event that anyhow affect to the service. By its type divided into two groups, static and dynamic events.

The phrase 'static events' means those events affecting the structure of the service. During life time of the service, such static events only occur less times. An example of this is a service registration or the modification of parameters of service.

The phrase 'dynamic events' means those events that affect to operational status or quality of service. During life of service these occur many times. An example of this is a failure of pipe bearing the service.

'Event source type' means a grouping of event sources by their event-handling method. An example of this is a specific signal type of a specific equipment type.

'Event source' is source of event belonging to either event source type and can be e.g. an instance of a specific equipment. The event source can be represented by an alert-object. This object can be identified by e.g. name or names or numeric value or sequence of numeric values.

'Event status' represents information specifying a status carried by the event. Possible examples are: operational, failed, administratively down or dormant. At implementation can be a string or enumerated or numeric value.

An 'alert-object' represents substantial or abstract network or service object. It differs from the managed object mentioned above in that an object mapped by it is not always managed but can be used for managing.

An 'incoming network event' provides dynamic input information for operation of the whole system. It must contain information to identify the event source and assess status.

The 'assign-to-service' or 'network-to-service' assignment information describes relations between event sources and services.

The assign-to-network or network-to-network assignment information describes relations between event sources. This is for example depending object or a "bearer-beared" type assignment.

A 'bearer object' provides operation for other object. An example of this, bearer object for water is a pipe or a bottle.

A 'beared object' means an object having operation provided by another object. An example of this, beared object for pipe is a water or gas. Used to work around linguistic problem of expressing unambiguously pair of noun "bearer".

'Memorabilia' means a memory area where memories to be remembered are stored. Used to work around linguistic problem of "memory memory".

A 'dependant object' has a status depending from status of another object.

A 'common event format' comprises unambiguous identification of an event source, a current status, operational status expressed as a percentage, failure cause expressed as a common event-format. It can include—depending on precision of implementation—e.g. failure causes expressed as a common event format to implement failure cause of failure cause, a timestamp, more independent status for precise expression.

An 'operational status' means a status expressed as a percentage, precisely defining the status carried by event as a percentage. An example of this, error-free operation can be expressed as 100%, a failure as 0%. It can be implemented as a string or numeric value or numeric value in floating point form, e.g. expressed as percent, per thousandth or ten-thousandth.

The parser module can be implemented in form of a program or rule, in software or firmware or hardware or combinations thereof.

Because of flexibility of the system, forwarding an event to the parser module can be realized by forwarding to other or to own module.

The converting and projecting function can be a run of a program or a rule, in software or firmware or hardware or any combination thereof.

The two steps of processing can be done in same or different programs or rules, in software or firmware or hardware or any combination thereof. Information exchange between two mentioned steps can be such a function or method parameter or object, or even network protocol.

DETAILED DESCRIPTION OF THE INVENTION

FIG. 1 shows a typical implementation configuration case where an incoming event carries assign-to-service information. A network parser module 1 receives incoming type 1 events 11. These events 11 are converted to common event-format and then will be forwarded as common-format network events 12 13. A network parser module 2 receives incoming type 2 events 21. The module 2 will also receive incoming type 2 events 24 from one or more other event sources. These events 11, 21, 24 will be converted to common event-format and then forwarded as common-format network events 22, 23. A common-format event 25 implements the co-action of network events and event types, and thereby a "failure cause of a failure cause" function. The common-format event 25b can be directed to own module. The common-format event 25 can be used for load sharing. The common-format event 25, 25b can be used to forward events of dependant objects. The common-format event 25, 25b can be used to forward events of bearer or beared objects. The service parser module 3 receives events 12, 22 form network parser modules 1 and 2. These events will be projected to services and the resulting service-event will be forwarded in a common event format 31. This method supports configuration having a service-type object bearer of service. This can be implemented by common-format event within service parser module 35b and enables implementing an ITU-T service and service access point structure. The already formatted events 13, 23, 31 will be received by an alert parser module 4 for storage. The actual and stored information can be accessed through a database based application programming interface (API) 41.

FIG. 2 shows a further typical implementation configuration case where an incoming event carries assign-to-service information. The network parser module 1 receives incoming type 1 events 11. These events 11 will be converted to common event-format and then will be forwarded as common-format network events 12 13. The network parser module 2 receives incoming type 2 events 21. The module 2 will also receive incoming type 2 events 24 from other event source. These events are converted to common event-format and then will be forwarded as common-format network events 22, 23. The common-format event 25 implements the co-action of network events and event types, and thereby a "failure cause of a failure cause" function. This common-format event 25b can be directed to own module. The common-format event 25 can be used for load sharing. The common-format event 25, 25b can be used to forward events of dependant objects. The common-format event 25 25b can be used to forward events of bearer or beared objects. The service parser module 3 receives events 12, 22 form network parser modules 1, 2. These events will be projected to services and the resulting service-event will be forwarded in the common event format 31. This method supports configuration having a service-type object bearer of service. This can be implemented by common-format event within service parser module 35b and enables implementing the ITU-T service and service access point structure. The already formatted events 13, 23, 31 will be received by the alert parser module 4 for storage. The actual and stored information is accessible through database based application programming interface (API) 41. The monitoring of the opening calendars will be carried out by a parser module 6, sending an opening event if an opening change occurs. This opening event sent by the parser module 6 will be received by the alert parser module 4 and will modify the related events e.g. relating to their severity. The 5 database parser module maintains a static database, and receives and serves database maintain requests received from a database based application programming interface (API) 51. The so maintained database provides static information for the parser modules 1, 2, 3, 4, 6.

Figure 3:
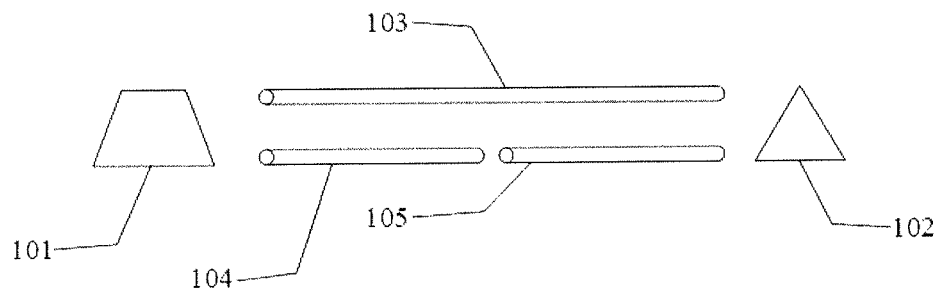
FIG. 3 is a view showing a method of two-dimensional route description using simplistic example.

FIG. 3 shows via a simplistic example of providing water service a method for two-dimensional route description. Service for a customer 102 is based on a well 101. Head-pipe 103 and auxiliary-pipes 104, 105 supply the water. Route description of this example is illustrated in Table 1:

TABLE 1

| Path | Element within path | Object reference in FIG. 3 |
| --- | --- | --- |
| 0 | 0 | 101 |
| 0 | 1 | 103 |
| 0 | 2 | 103 |
| 0 | 3 | 102 |
| 1 | 0 | 101 |
| 1 | 1 | 104 |
| 1 | 2 | 105 |
| 1 | 3 | 102 |

Figure 4:
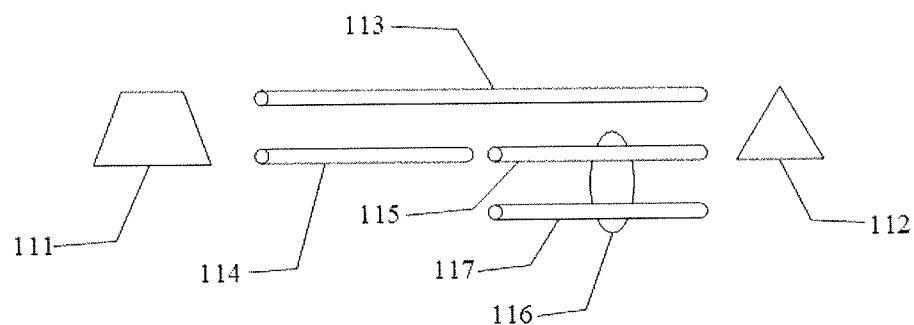
FIG. 4 is a view showing a method of three-dimensional route description using simplistic example.

FIG. 4 shows via a simplistic example of providing water service a method for three-dimensional route description. Service for a customer 112 is based on a well 111. Head-pipe 113 and auxiliary-pipes 114, 115 supply the water. Pipes 115, 117 have a common active antifreeze system 116. The pipe 117 does not serve the customer 112. Route description of this example is illustrated in Table 2:

TABLE 2

| Path | Element within path | Element within path bearer | Object reference of FIG. 4 |
| --- | --- | --- | --- |
| 0 | 0 | 0 | 111 |
| 0 | 1 | 0 | 113 |
| 0 | 2 | 0 | 113 |
| 0 | 3 | 0 | 112 |
| 1 | 0 | 0 | 111 |
| 1 | 1 | 0 | 114 |
| 1 | 2 | 0 | 115 |
| 1 | 3 | 0 | 112 |
| 1 | 2 | 1 | 116 |

Example of Operation

In this chapter of the description the phrase 'variable' relates to the implementation of a method carried out by a computer program. Implementing by hardware, numeric variable means a counter, a variable containing an identifier means memory area, a three-dimensional array variable means a memory area addressable by a three-dimensional index.

In practice, events occur in interconnected systems with a variable intensity. These events are input of the method. This method will process it, change it, add information and build memorabilia using complicated rules.

Figure 7:
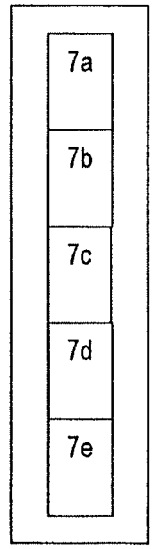
FIG. 7 is a view showing an overview of the FIGS. 7a to 7e.
Figure 7A:
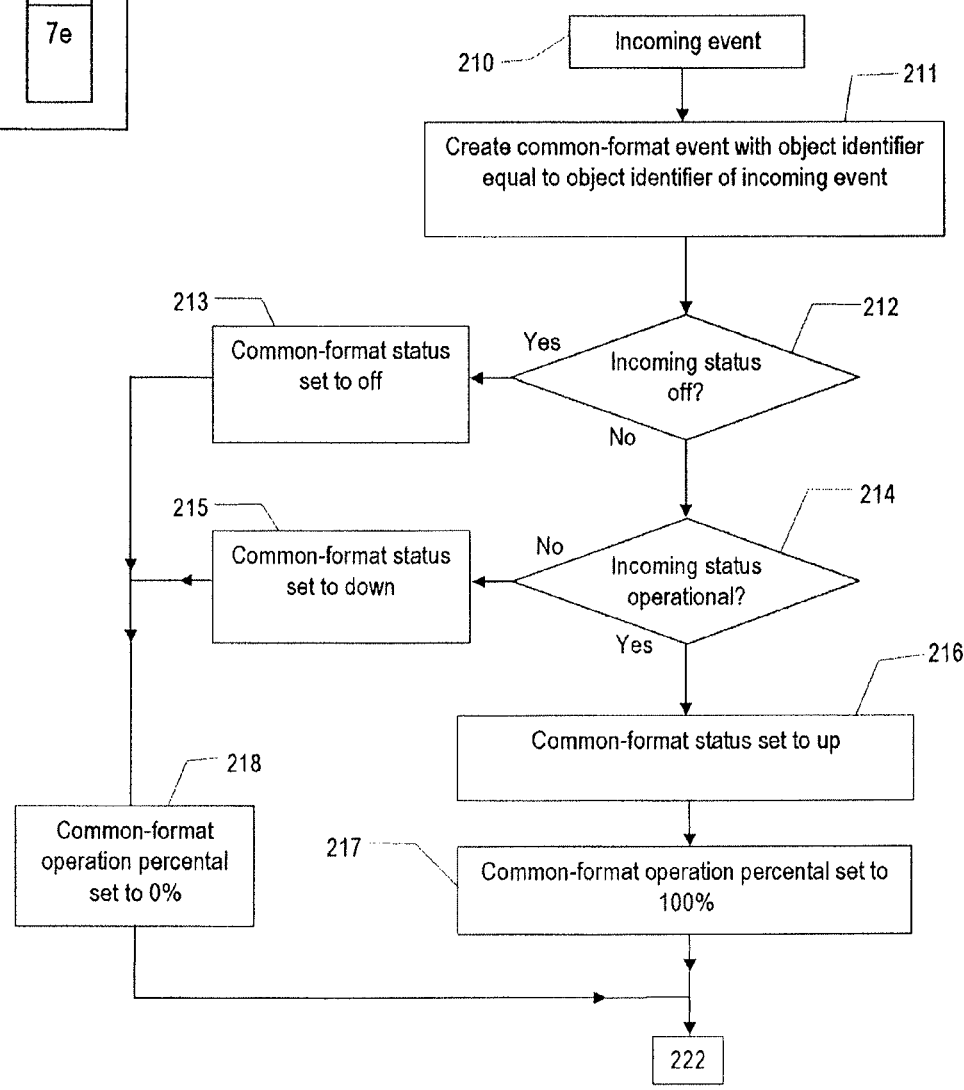
FIGS. 7a to 7e show a flowchart of an exemplary operation of a network parser module.
Figure 7B:
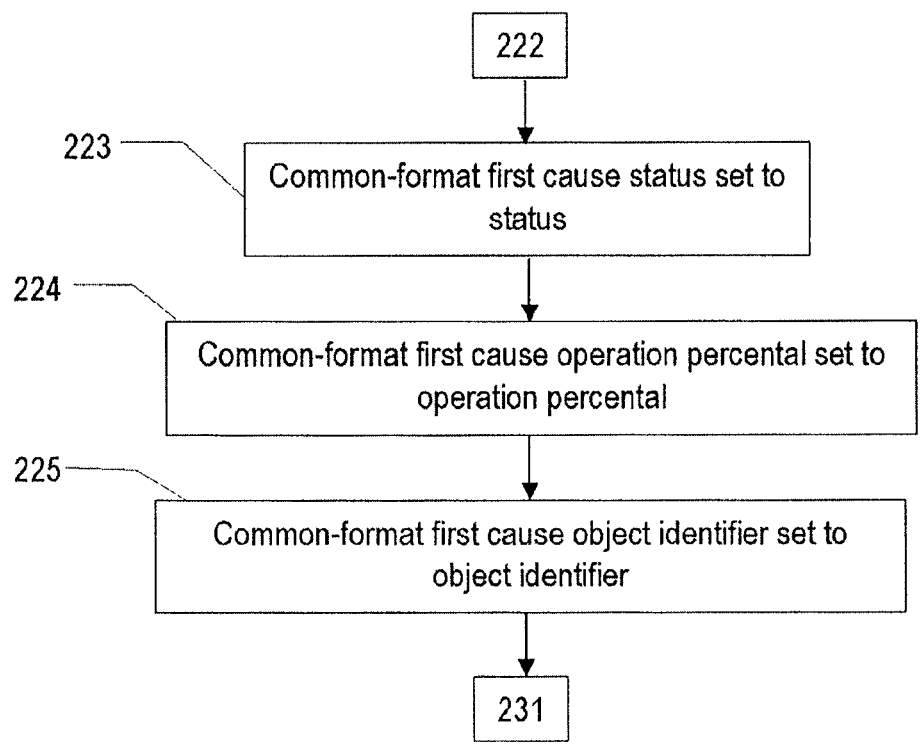
Figure 7C:
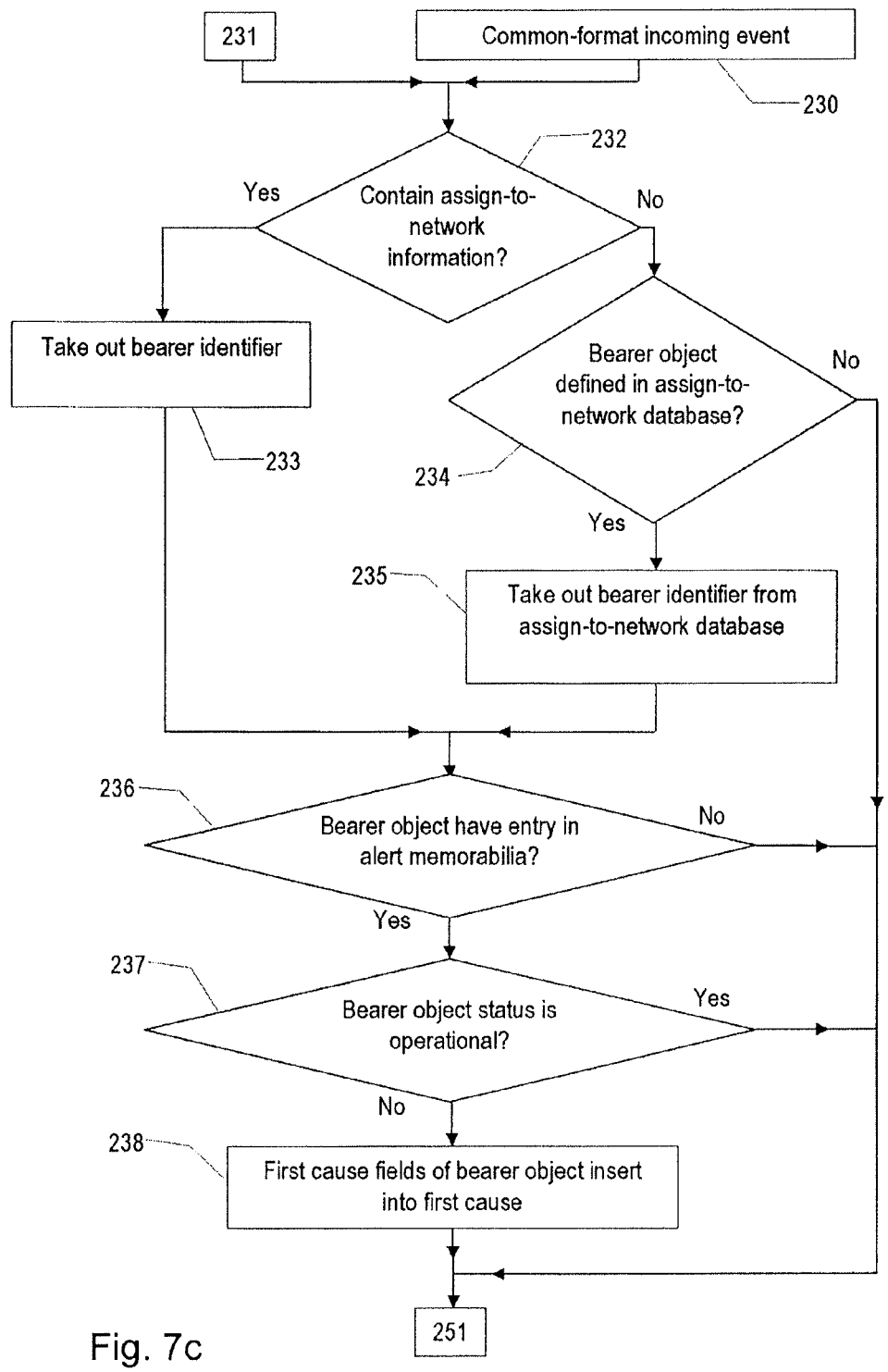
Figure 7D:
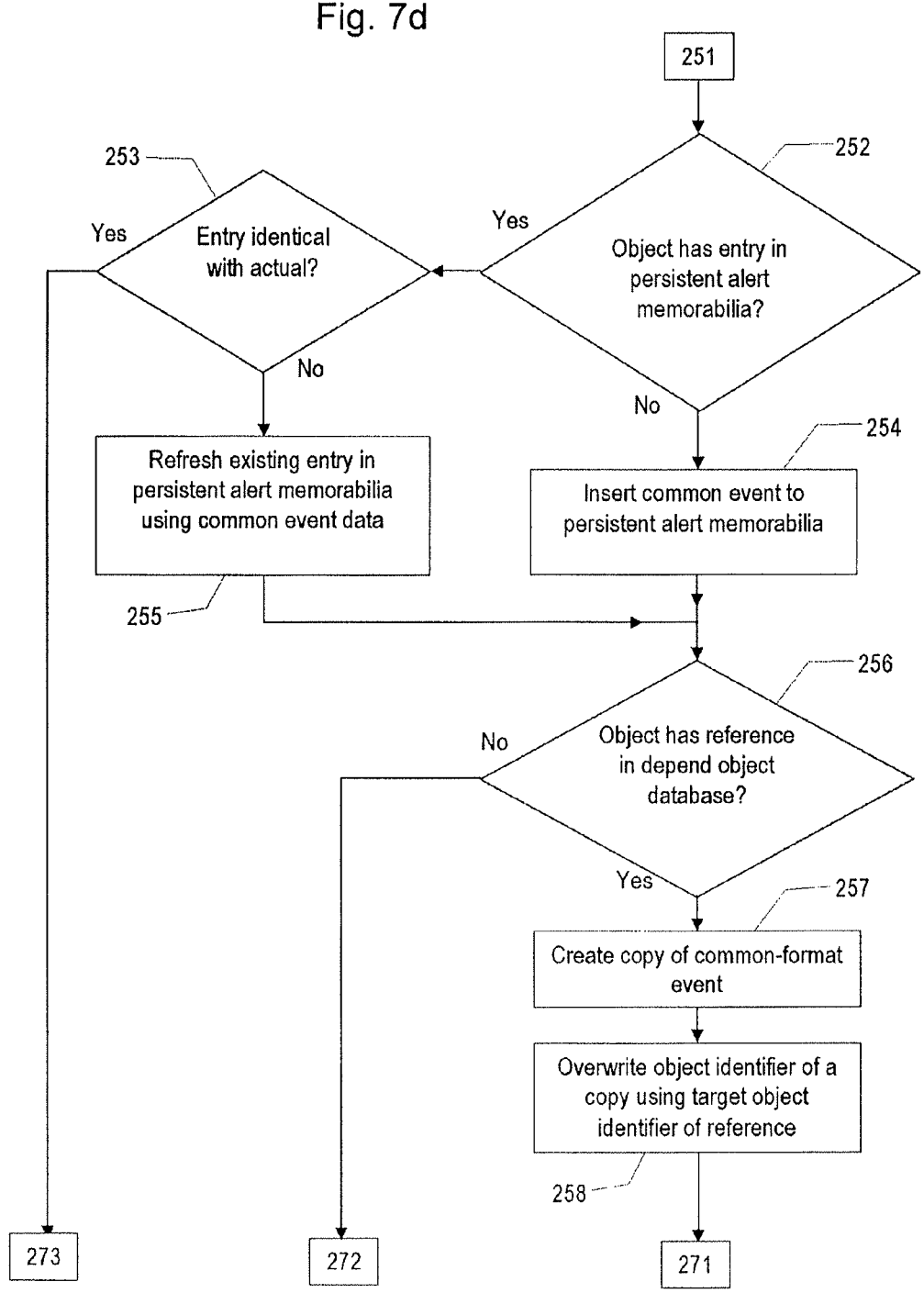
Figure 7E:
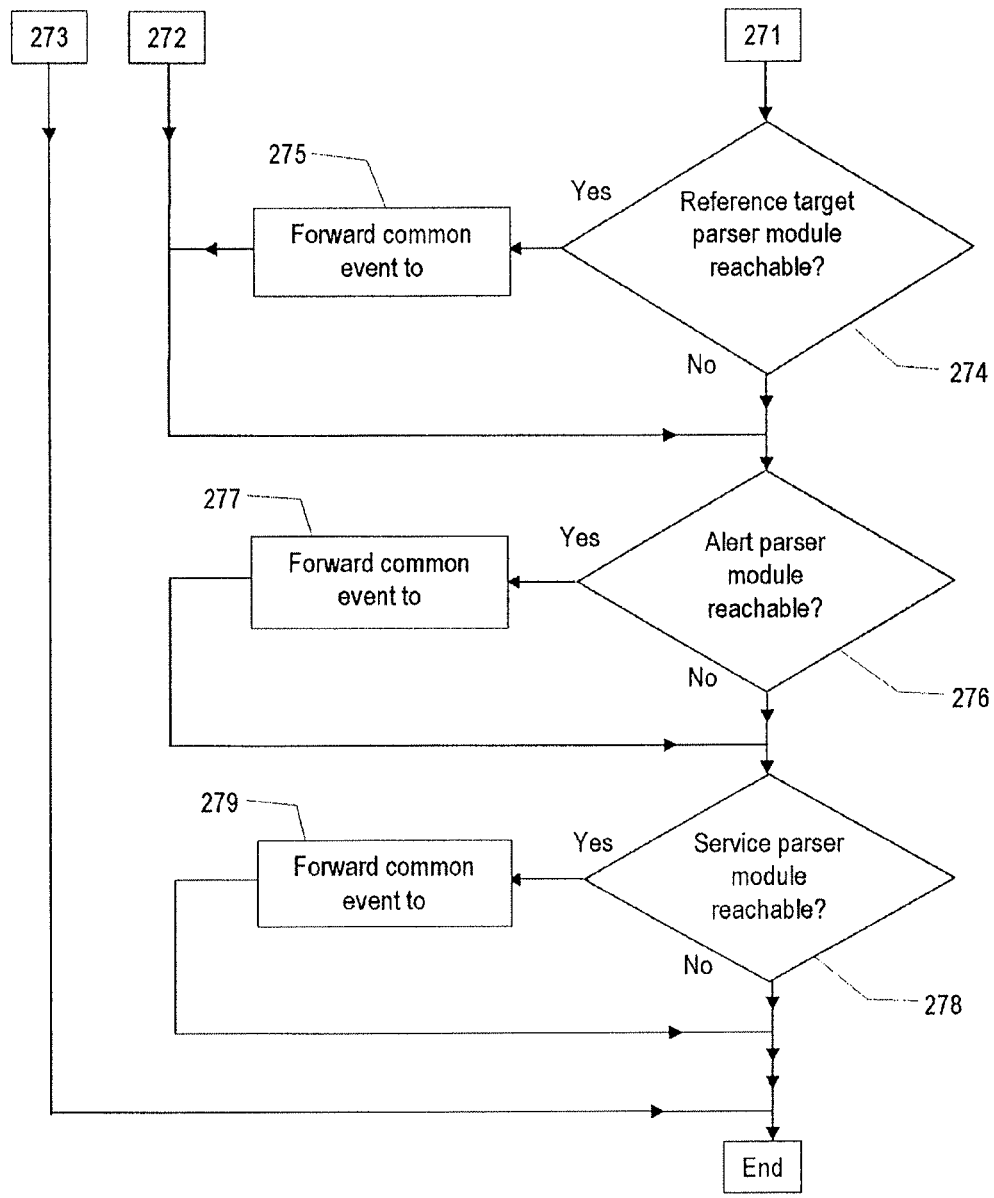

The network event 11, 21, 24, enters in step 210 into the network parser module 1, 2 (see FIG. 7). The format of the event must not be determined exclusively, because meaning and point of this method is capability to handling any type of event. The minimum content of an incoming event is described in the chapter "Definitions" above. One possible format is described in chapter "One exemplary embodiment" above.

In order to receive a network event in step 211 a common-format event will be created having an object identifier identical to the object identifier of the incoming event. Minimum content of the incoming event is described in chapter "Definitions" and one possible format is described in chapter "One exemplary embodiment". Assess status of object using information of incoming event. If in step 212 it is determined that its status administratively down, then in step 213 the common-format status will be set to 'off', and in step 218 the common-format operation will be set to 0%. If in step 214 is determined that its status is not operational, then in step 215 common-format status will be set to 'down', and in step 218 the common-format percental operational status will be set to 0%. In any other case the common-format status will be set in step 216 to 'up', and the common-format percental operational status will be set in step 217 to 100%. In step 223, common-format first failure cause status will be set to common-format status. Common-format first failure cause percental operational status will be set in step 224 to common-format percental operational status. Common-format first failure cause identifier will be set in step 225 to common-format identifier. The result event is a common-format network event. From viewpoint of processing its source can be an own parser module, or can refer in step 230 to dependant object 25b of the own parser module, or dependant object 25 of other parser modules.

Next, relations between network objects, and particularly to assess bearer network object will be assessed. In step 232 the object identifier of common-format event will be checked, as to whether or not it contains assign-to-network information. Depending on implementation this can be done with checking structure of identifier or comparing the value of a constant. One possible implementation of identifier assignment has been described in chapter "One exemplary embodiment". If the object identifier contains assign-to-network information, then in step 233 the identifier of bearer object will be retrieved. If the object identifier does not contain assign-to-network information then in step 234 it will be determined as to whether or not the bearer object has been defined in an assign-to-network database. One possible implementation of assign-to-network database is described in chapter "One exemplary embodiment". If the bearer object has been defined, then in step 235 the bearer object identifier will be retrieved from the assign-to-network database. Because the identifier of bearer object is known, in step 236 it will be checked as to whether or not it has an entry in alert memorabilia. If it has an entry, then in step 237 it will be checked as to whether or not the bearer object status is operational. If it is not operational, then in step 238 first failure cause field of bearer object will be inserted into the first failure cause (created in step 211).

In next step creating persistent alert memorabilia entry of network object based on common-format event. In step 252 it will be determined as to whether or not the object has an entry in persistent alert memorabilia. If not, then in step 254 a common event will be inserted to persistent alert memorabilia. If it has, then in step 253 it will be determined as to whether or not the content of entry is identical with common-format event created before. If not identical, then in step 255 the existing entry in persistent alert memorabilia will be updated using common event data.

In next step it will be determined using static depend database as to whether or not there are other objects showing operation that depends on this object. One possible implementation of dependant object database is described in chapter "One exemplary embodiment". In step 256 it will be determined as to whether or not the object has a reference in depending database. If it has, then in step 257 copy of common-format event will be created and in step 258 the object identifier of a copy will be overwritten using target object identifier of reference. Then in step 274 it will be determined as to whether or not the target parser module 1 is reachable. If reachable, then in step 275 the modified event copy 25 25b (created in step 257) will be forwarded to.

In next step 276 it will be determined as to whether or not the alert parser module 4 is reachable. If reachable, then in step 277 the original common-format event 13 23 (created in step 211) will be forward to.

In next step 278 it will be determined as to whether or not the service parser module 3 is reachable. If reachable, then in step 279 the original common-format event 12 22 (created in step 211) will be forward to.

Figures 8, 8A:
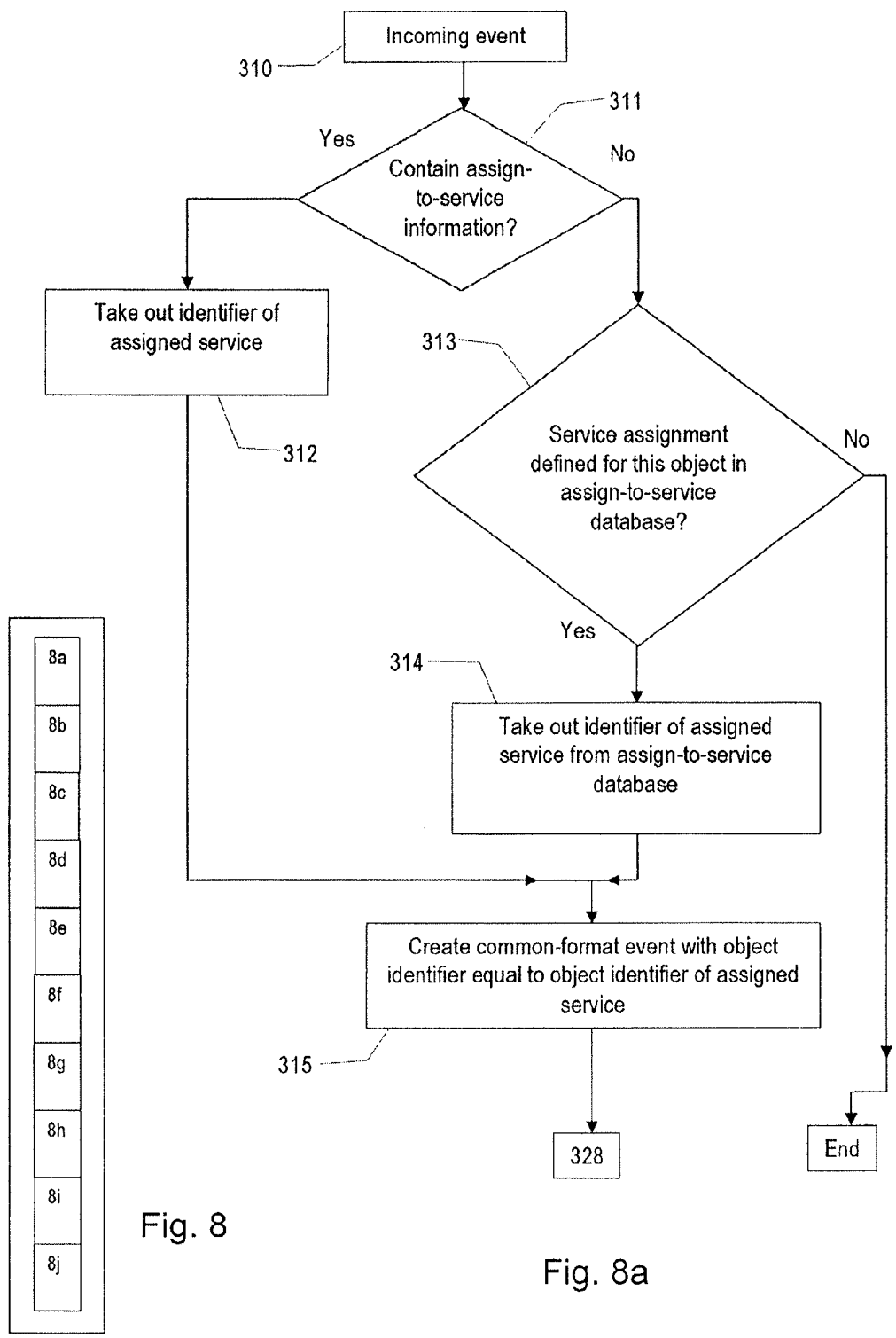
FIG. 8 is a view showing an overview of the FIGS. 8a to 8j.
FIGS. 8a to 8j show a flowchart of an exemplary algorithm of a service parser module.
Figure 8B:
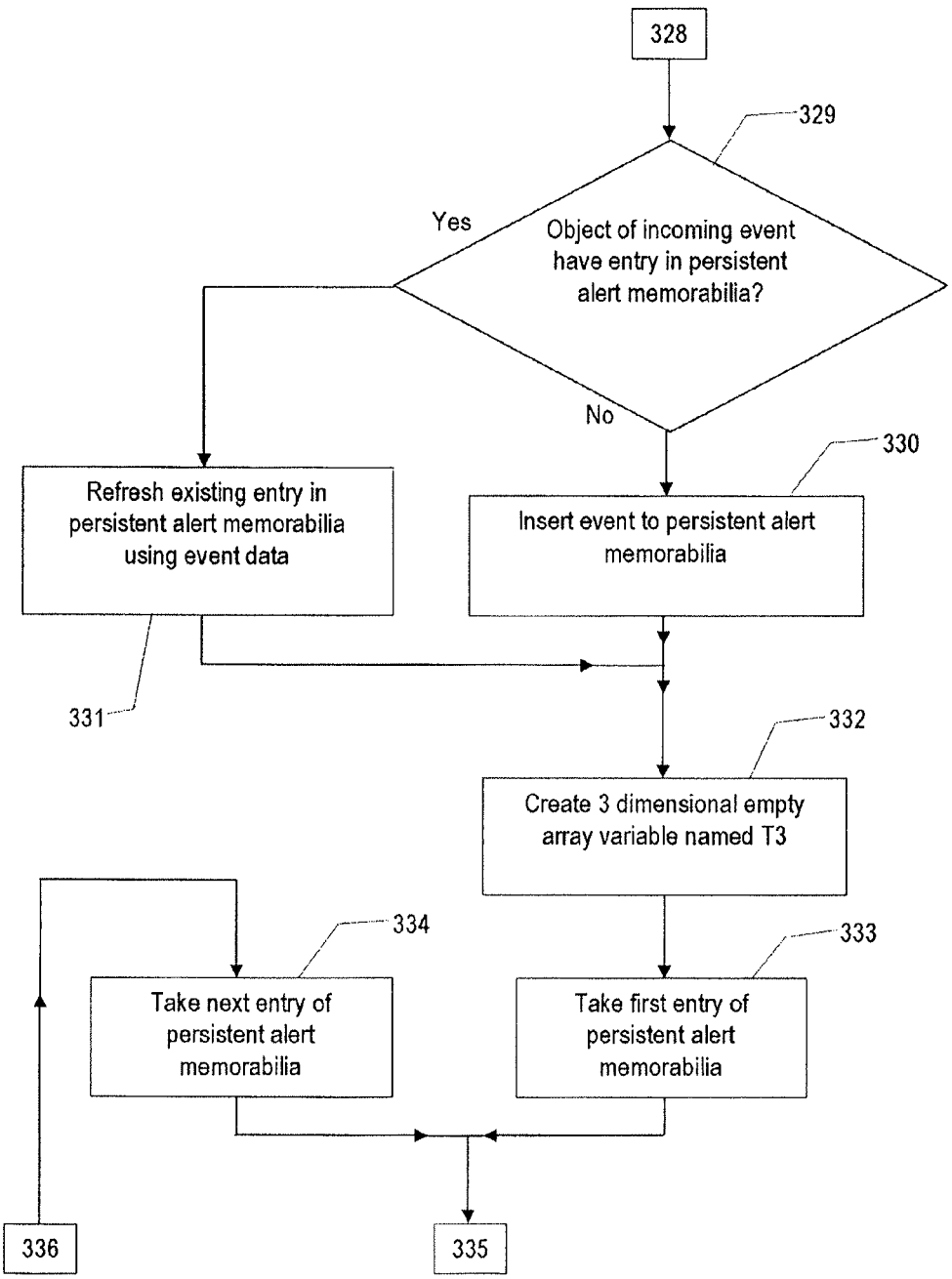
Figure 8C:
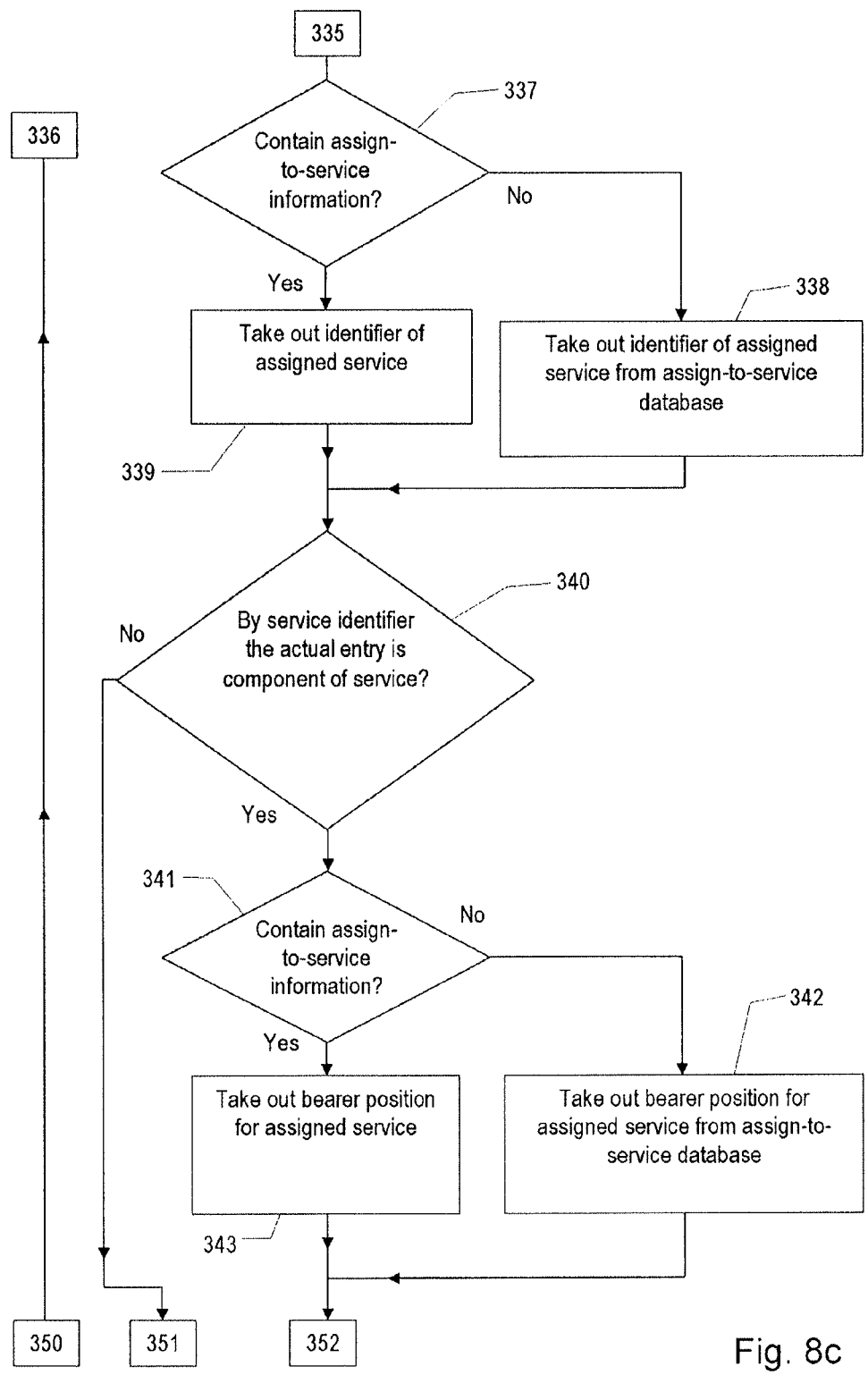
Figure 8D:
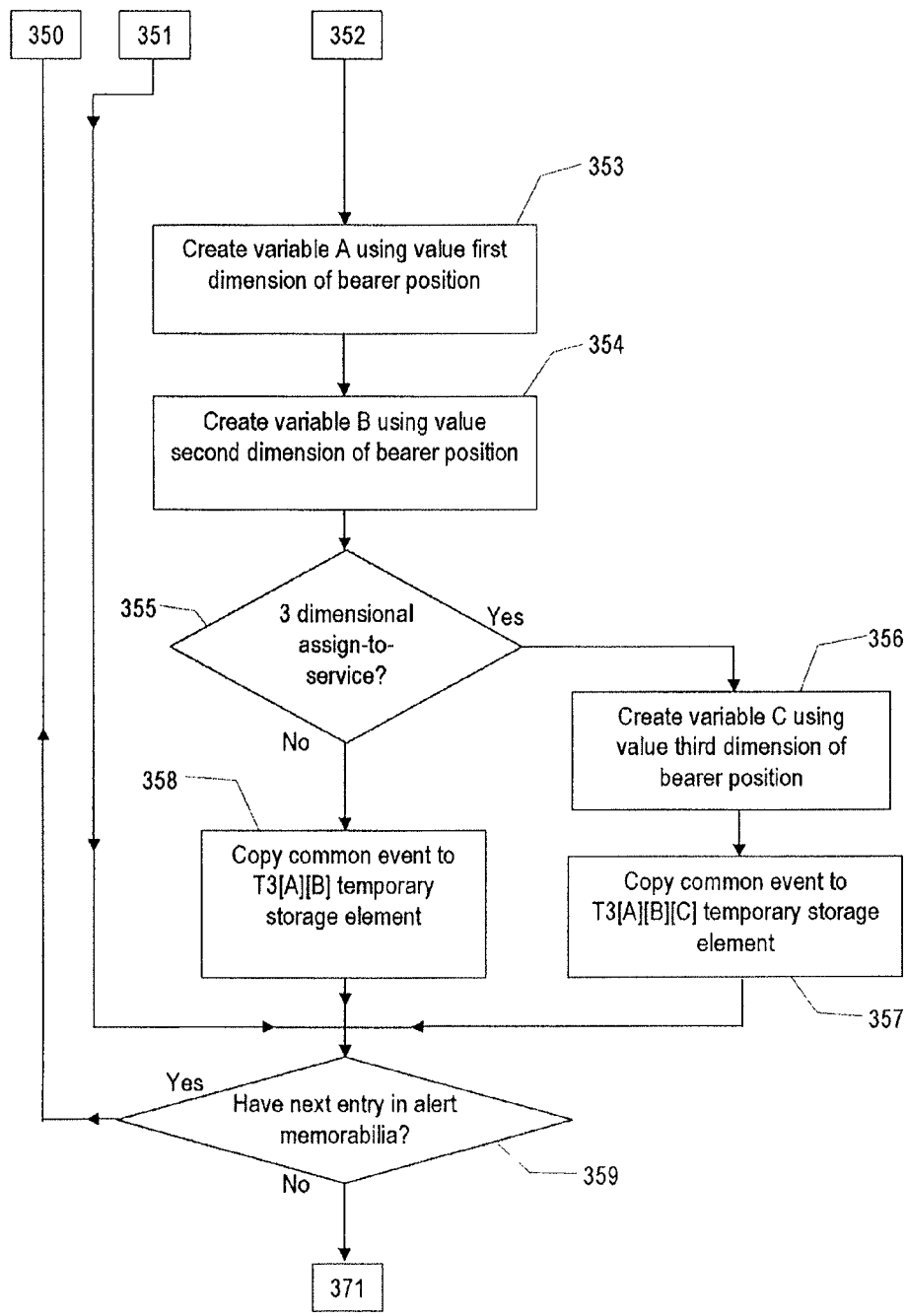
Figure 8E:
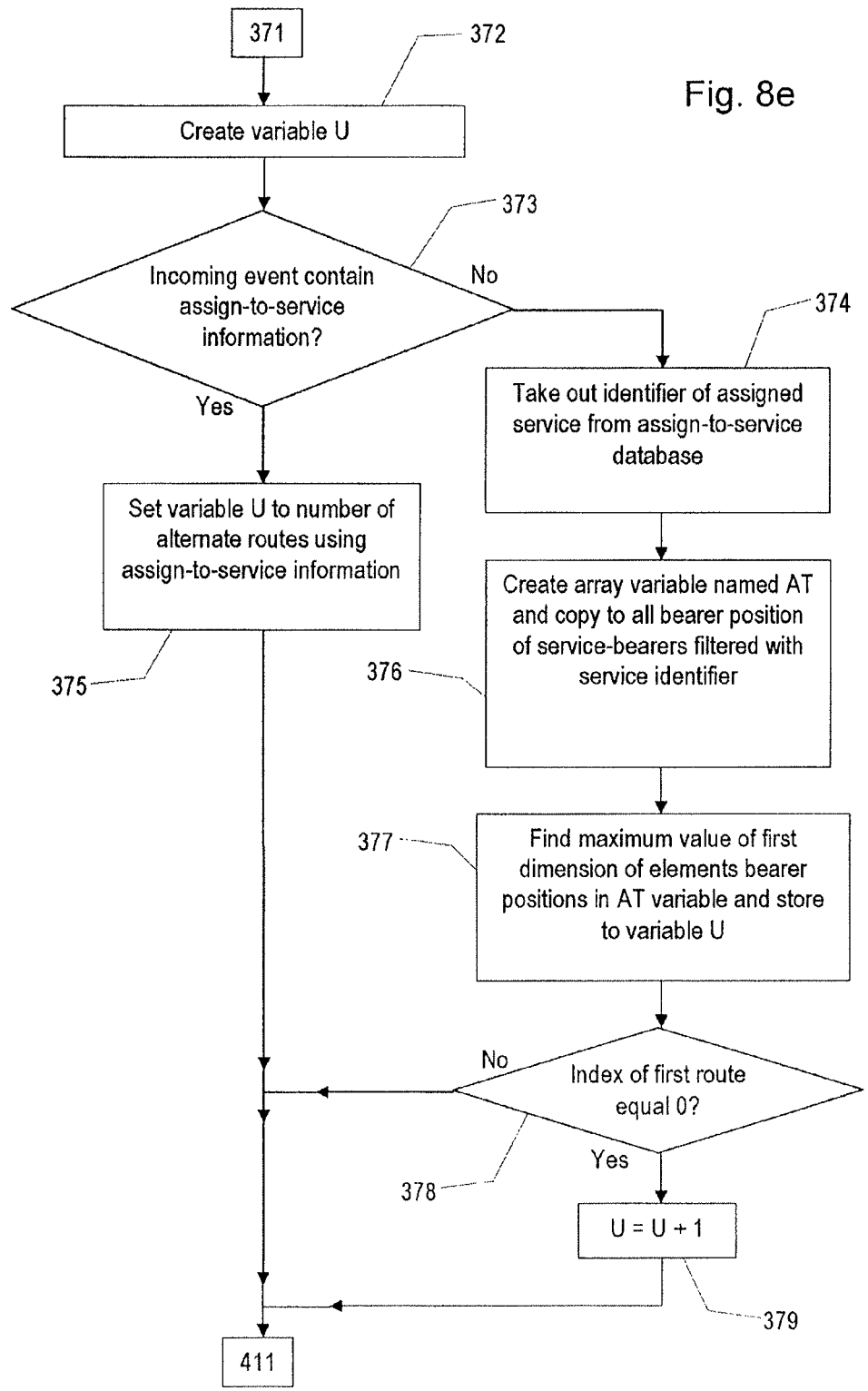
Figure 8F:
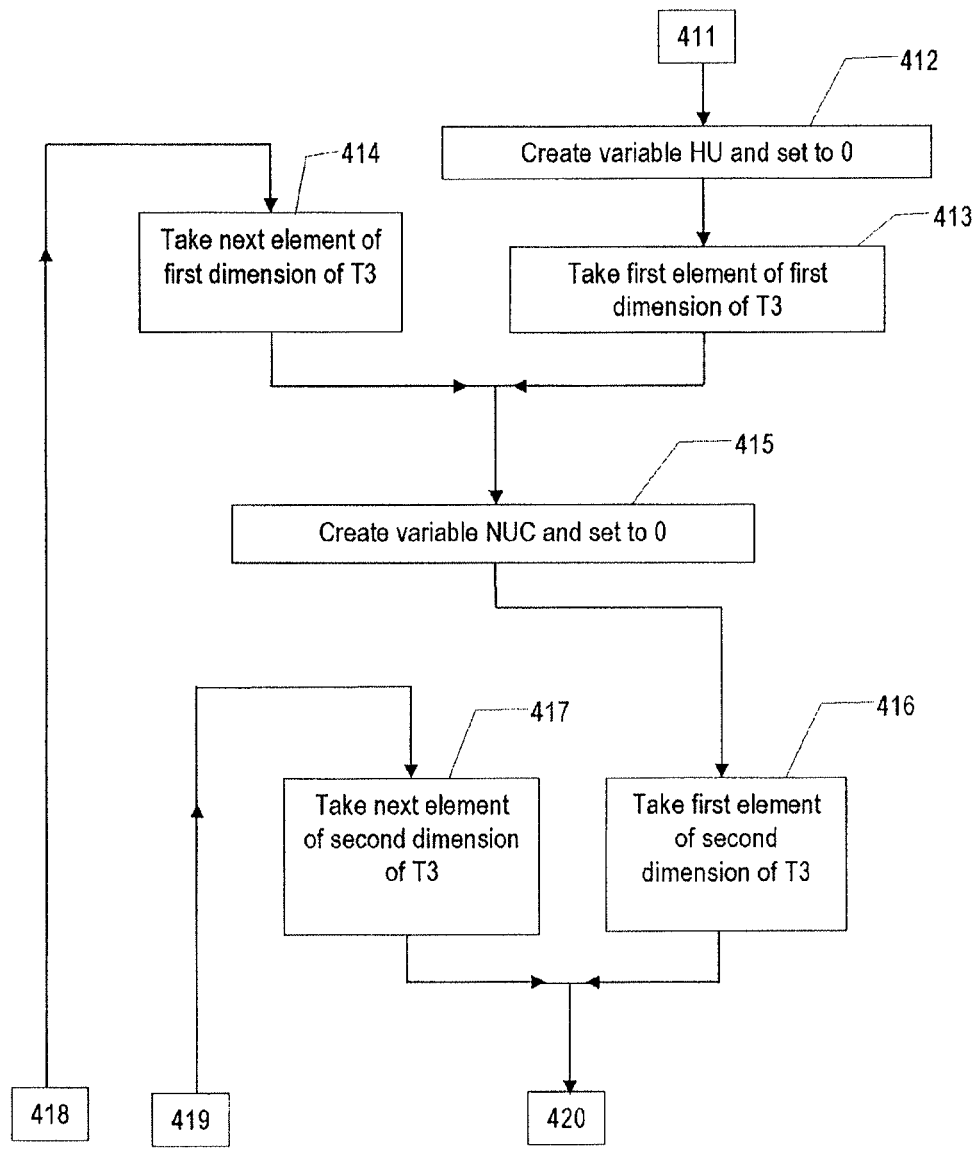
Figure 8G:
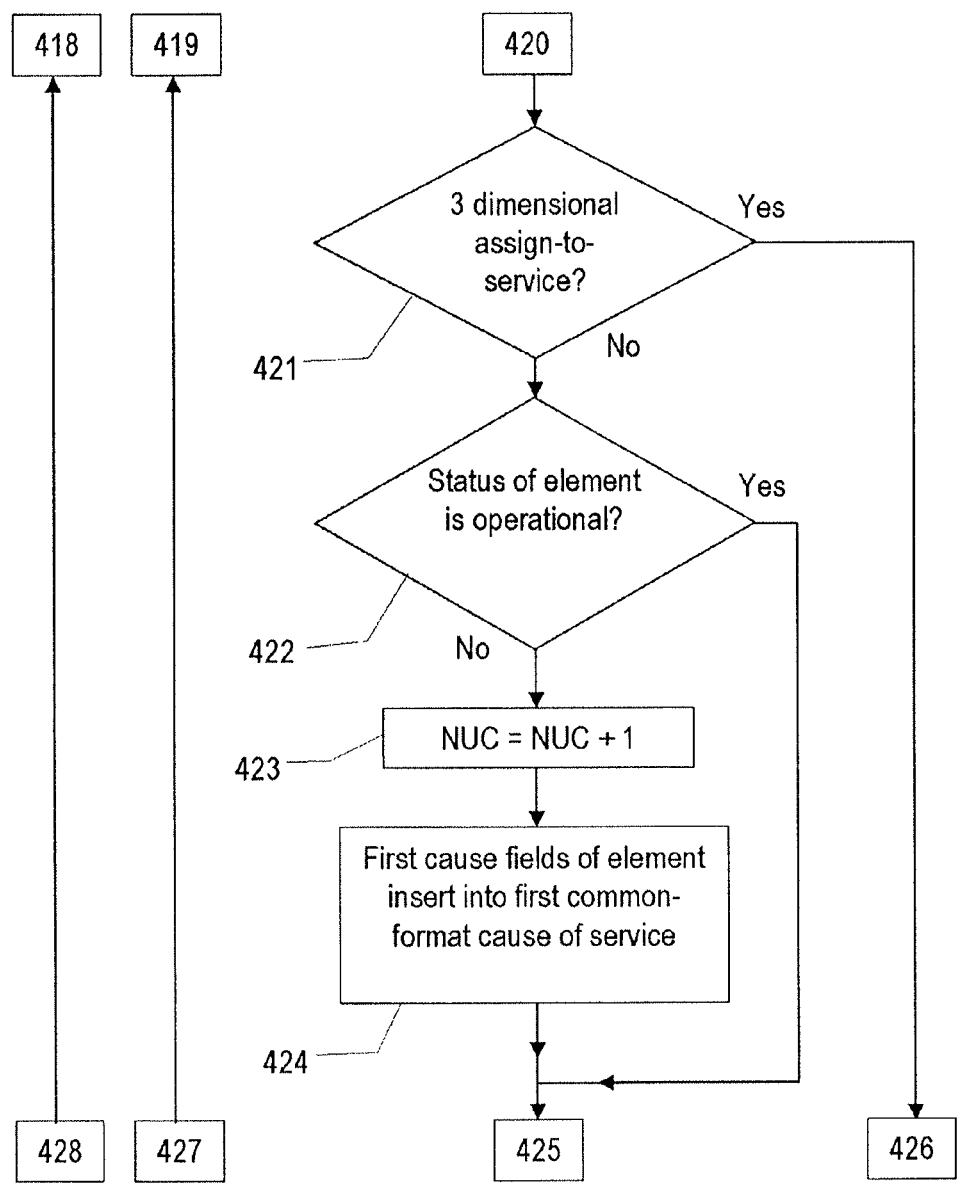
Figure 8H:
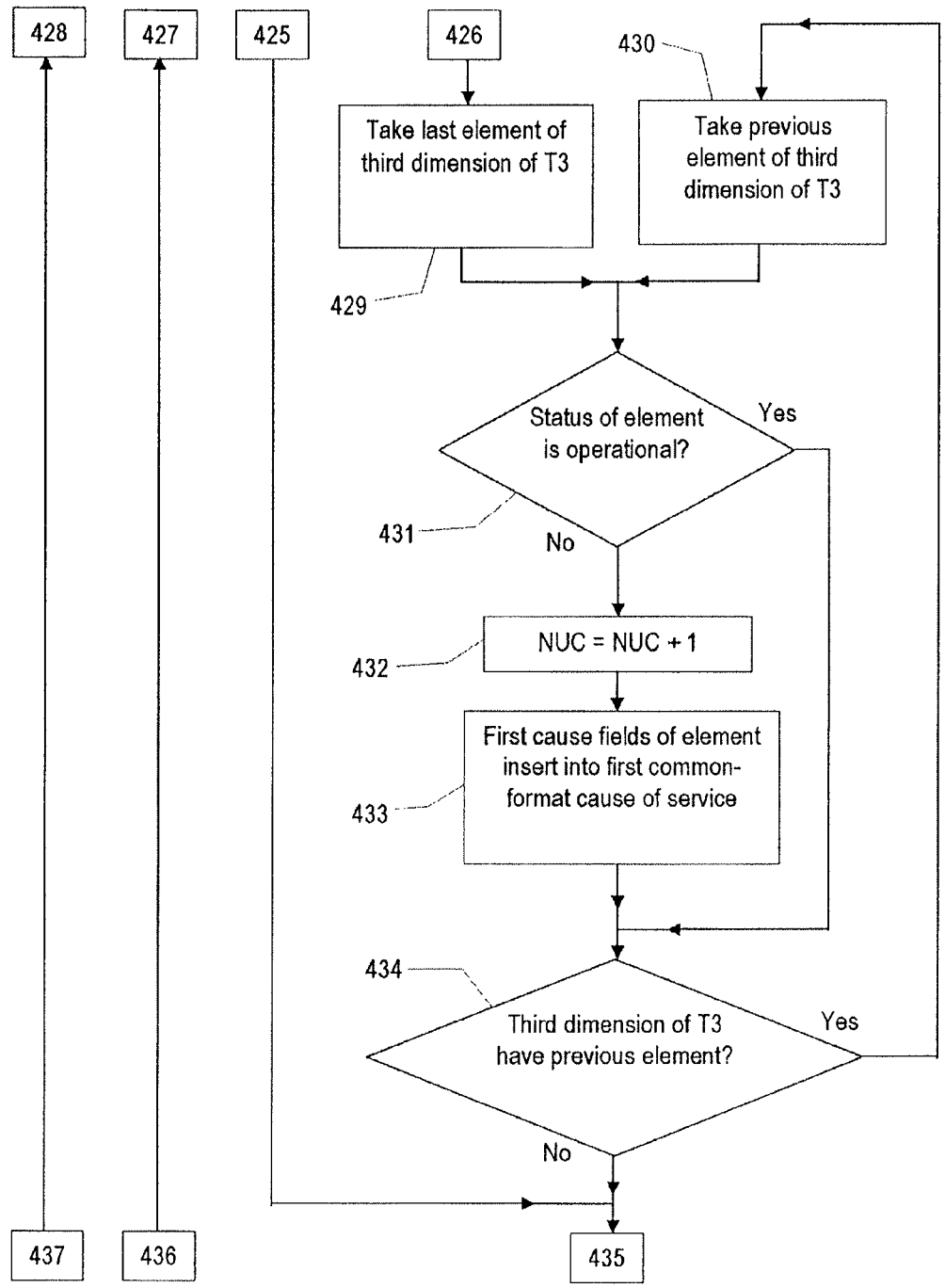
Figure 8I:
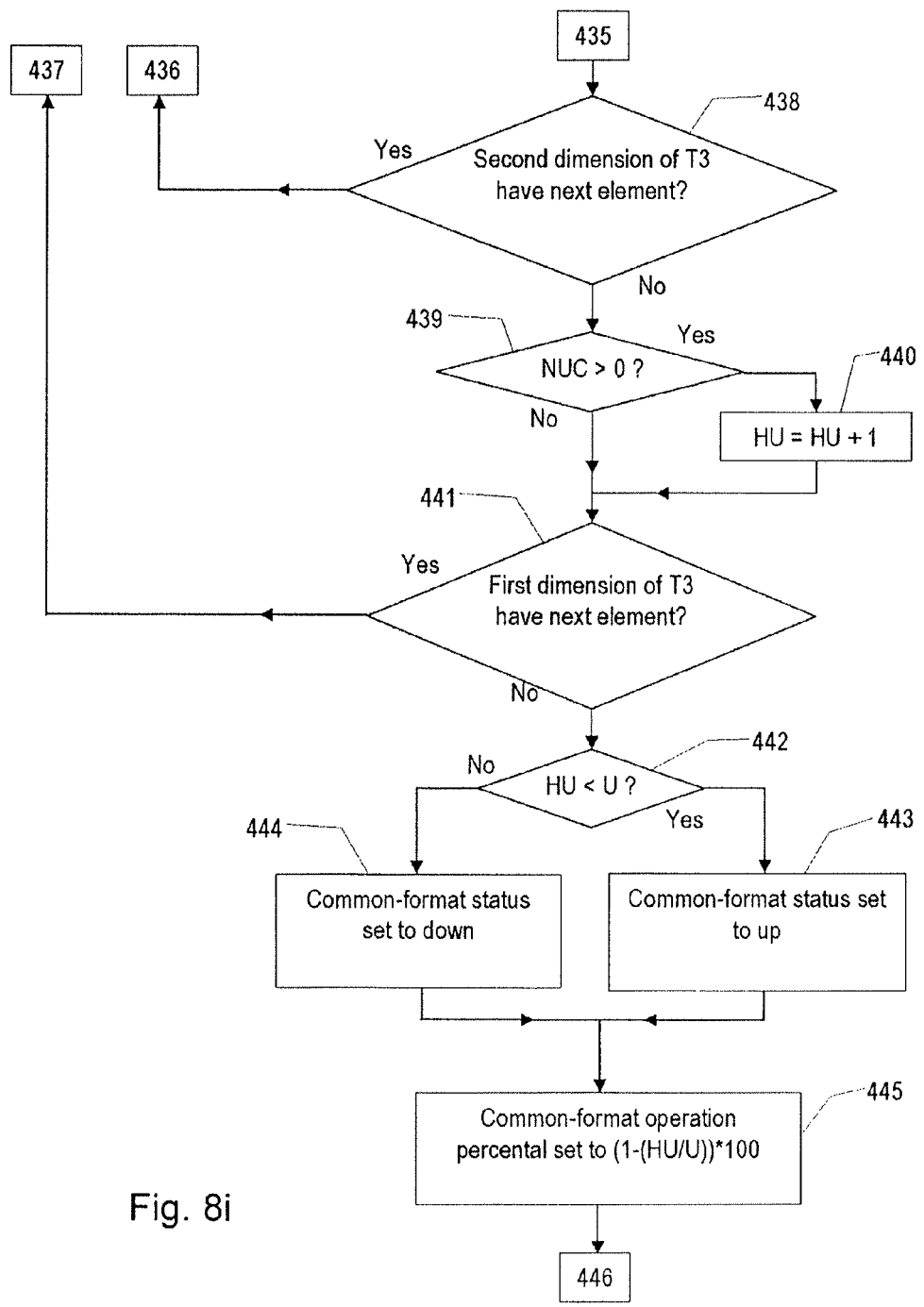
Figure 8J:
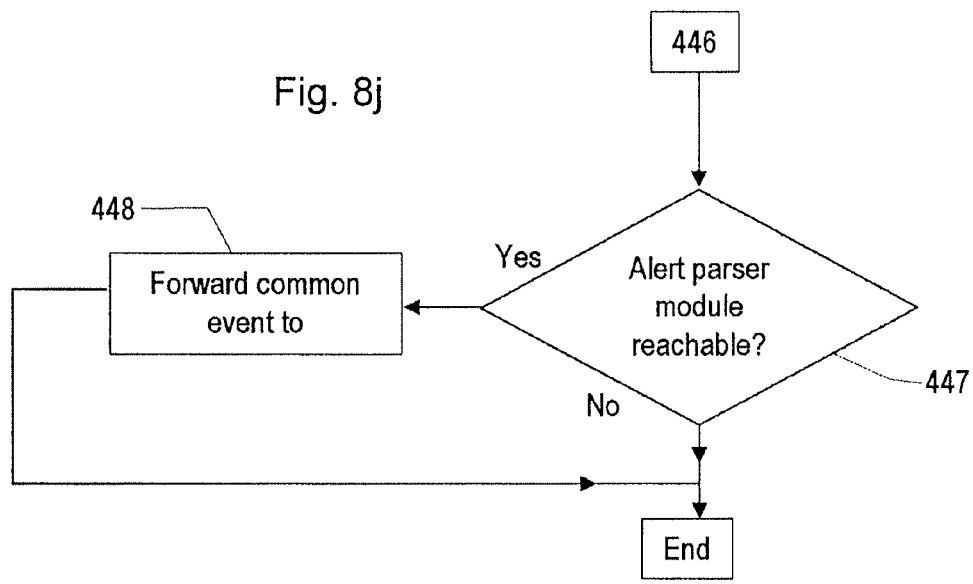

In step 310 the common-format event 12, 22 enters into the service parser module 3 (see FIG. 8). The first step is to assess relations between service and network objects. In step 311 it will be determined as to whether or not the object identifier of common-format event contains assign-to-service information. Depending on implementation this can be done by checking the identifier structure or comparing the value of a constant. One possible implementation of the identifier assignment is described in chapter "One exemplary embodiment". If it contains, then in step 312 the identifier of beared service object will be retrieved. If not, then in step 313 it will be determined as to whether or not the bearer object is defined in assign-to-service database. One possible implementation of assign-to-service database is described in chapter "One exemplary embodiment". If it is defined, then in step 314 the beared service object identifier will be retrieved from the assign-to-service database. Then in step 315 a common-format event with object identifier equal to object identifier of assigned service will be created.

Next, a persistent alert memorabilia entry of network object based on common-format event will be created. In step 329 it will be determined as to whether or not the object has an entry in the persistent alert memorabilia. If not, then in step 330 a common event will be inserted into persistent alert memorabilia. If it has, then in step 331 existing entry will be refreshed in the persistent alert memorabilia using common event data.

In step 332 empty three-dimensional array temporary variable named T3 for temporary collection of bearer statuses will be created. Then in steps 333, 334 all persistent alert memorabilia entries will be checked. In step 337 it will be determined as to whether or not the object identifier of entry contains any assign-to-service information. Depending on implementation this can be done by checking the structure of the identifier or by comparing the value of a constant. If it contains, in step 339 the identifier of assigned service will be retrieved. If not, then in step 338 the identifier of assigned service will be retrieved from the assign-to-service database. If in step 340 it is determined that it has an assigned service and this is the subject service, then bearer position of network object will be retrieved. In step 341 it will be determined as to whether or not the object identifier of entry contains any assign-to-service information. Depending on implementation this can be done by checking the structure of identifier or by comparing the value of a constant. If it contains, then in step 343 the bearer position will be retrieved for assigned service. If not, then in step 342 the bearer position will be retrieved for assigned service from the assign-to-service database. In step 353 a temporary variable A will be created and its initial value will be set to first dimension of bearer position. In step 354 a temporary variable B will be created and its initial value will be set to second dimension of bearer position. In step 355 it will be determined as to whether or not the assign-to-service information is three-dimensional. Depending on implementation this can be done by checking the structure of the identifier or by comparing the value of a constant. If it is three-dimensional, then in step 356 a temporary variable C will be created and its initial value will be set to third dimension of bearer position. Then depending on number of dimensions of the assign-to-service information, in steps 357, 358 the common-format event will be copied to T3 temporary storage bearer position indexed element. Then in step 359 we will move to next persistent alert memorabilia entry if any.

If no more persistent alert memorabilia entry, then in step 372 a temporary variable U will be created. In step 373 it will be determined as to whether or not the object identifier of entry contains any assign-to-service information. Depending on implementation this can be done by checking the structure of the identifier or by comparing the value of a constant. If it contains, then in step 375 the variable U will be set to the number of alternative routes including the main route. If not, then in step 374 the identifier of assigned service will be retrieved from the assign-to-service database. In step 376 an empty one-dimensional array temporary variable named AT will be created and copied to all bearer position information of its bearers filtered with a service identifier. In step 377 maximum value of first dimension of bearer position will be searched for in the variable AT and stored to variable U. In step 378 if the index of the first route equals 0, then in step 379 the variable U will be incremented by 1. Depending on implementation this can be done by comparing the value of a constant.

In step 412 a temporary variable HU will be created and its initial value will be set to 0. Then in steps 413, 414, 441 all elements of the first dimension of T3 will be taken. In step 415 a temporary variable NUC will be created and its initial value will be set to 0. Then in steps 416, 417, 438 all elements of the second dimension belonging to actual first dimension of T3 will be taken. In step 421 it will be determined as to whether or not the assign-to-service is three-dimensional. Depending on implementation this can be done by checking the structure of the identifier or by comparing the value of a constant. If not, then in step 422 it will be determined as to whether or not the status of subject element is operational. If not, then in step 423 the variable NUC will be incremented by 1, then in step 424 the first failure cause fields of subject element will be inserted into first common-format failure cause of service (created in step 315). If in step 421 it is determined that the assign-to-service is three-dimensional, then in steps 429, 430, 434 all elements of third dimension belonging to the actual second dimension of T3 will be taken in backward direction. In step 431 it will be determined as to whether or not the status of subject element is operational. If not, then in step 432 the variable NUC will be incremented by 1, then in step 433 the first failure cause fields of subject element will be inserted into the first common-format failure cause of service (created in step 315).

If in step 438 it is determined that there is no more element in the second dimension, then in step 439 the value of NUC variable will be checked, i.e., it will be determined as to whether or not the value is greater than zero. If greater than zero, then in step 440 the variable HU will be incremented by one.

If in step 441 it is found that there are no more elements in the first dimension, in step 442 the value of variables HU and U will be checked. If it is found that HU is less than U, then in step 443 the common-format status of service (created in step 315) will be set to 'up'. If the value of the variable HU is not less than U, then in step 444 the common-format status of service (created in step 315) will be set to 'down'. Then in step 445 the common-format percental operational status of service (created at 315) will be set to $((1-(HU/U))*100)$.

In next step 447 it will be determined as to whether or not the alert parser module 4 is reachable. If reachable, then in step 448 the common-format service event 31 (created in step 315) will be forwarded to it.

Figure 9:
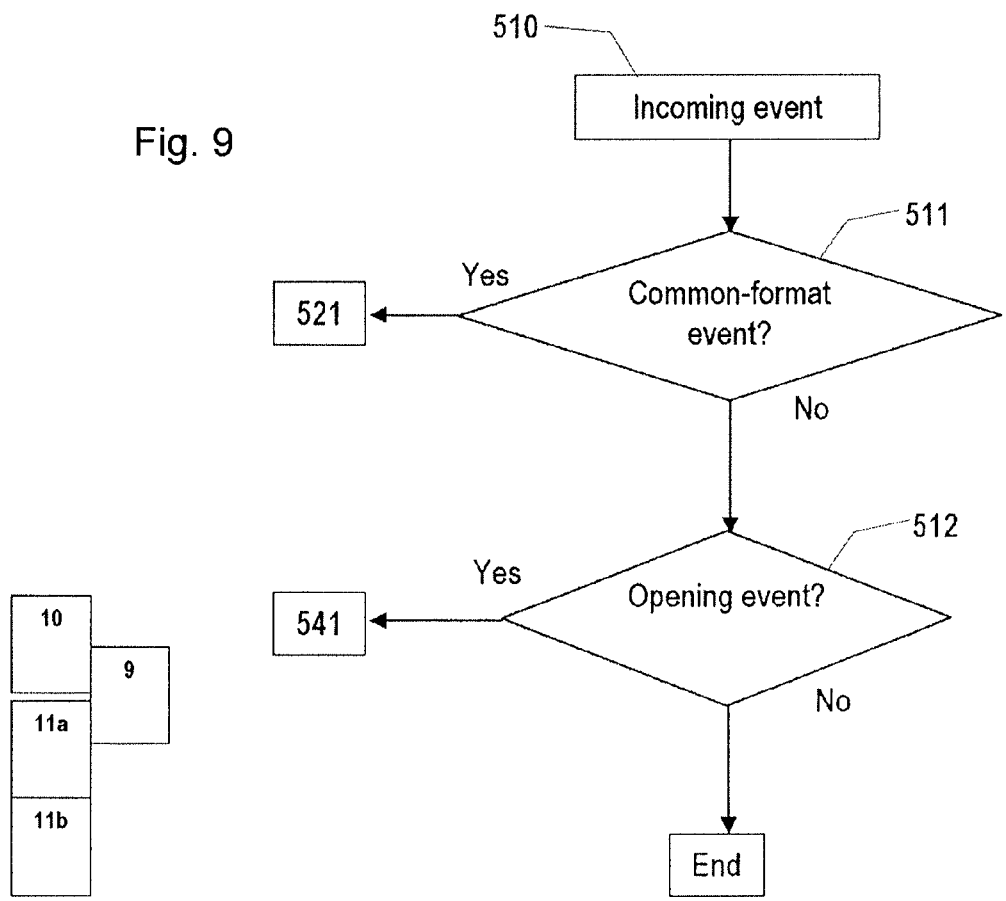
FIG. 9 is a view showing a flowchart of an exemplary algorithm of an alert parser module.
Figure 10:
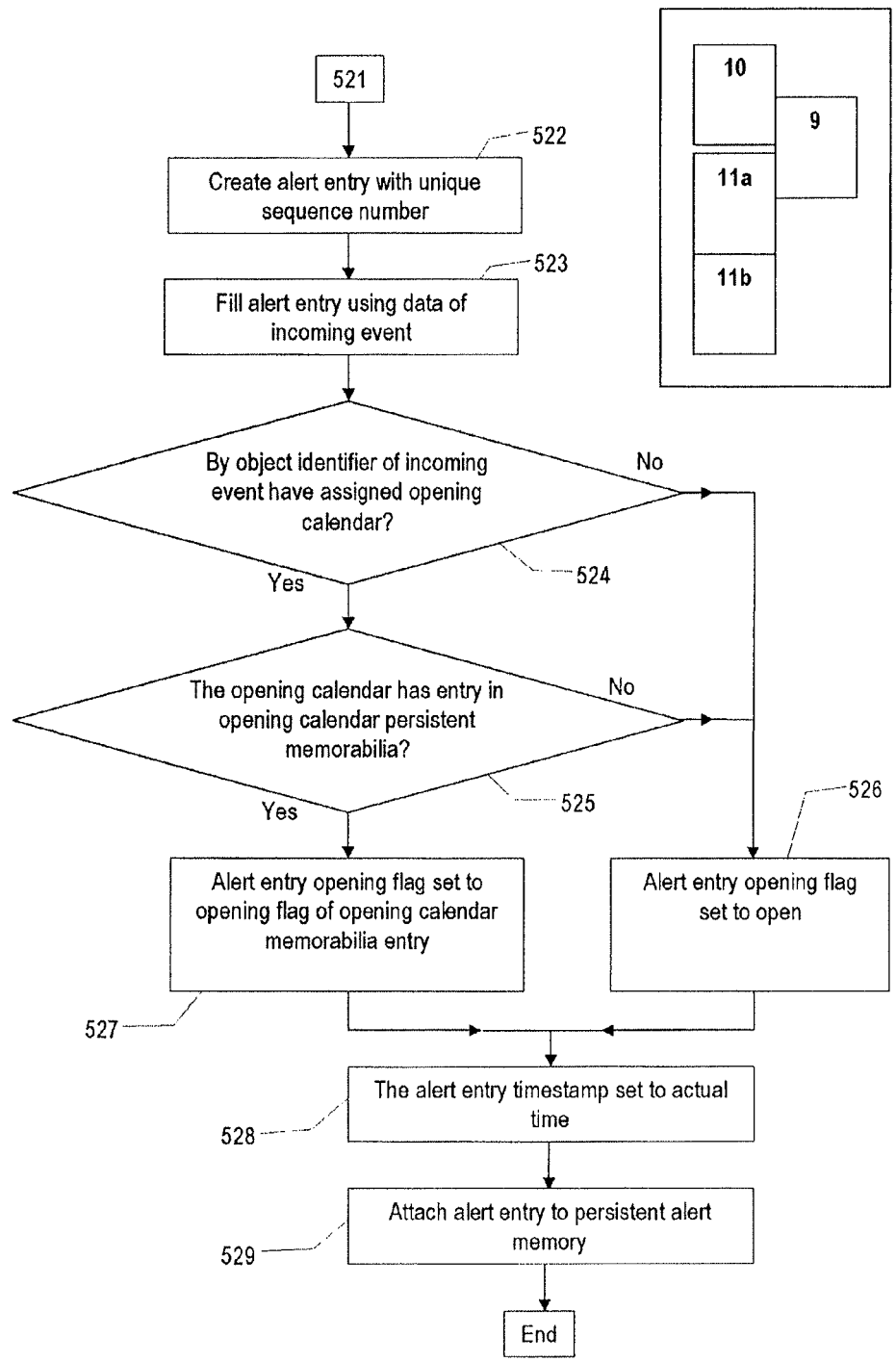
FIG. 10 is a view showing a flowchart of an alert-event handler algorithm of the alert parser module.

In step 510 the event enters into the alert parser module 4 (see FIG. 9). If in step 511 it is determined that the event 13, 23, 31 has common-format (see FIG. 10), then in step 522 a new alert entry will be created in alert database with unique sequence number. One possible format of alert database is described in chapter "One exemplary embodiment". In step 523 an alert entry will be filled up using data of incoming event. In step 524, it will be determined based on object identifier of the incoming event as to whether or not the opening calendar to alert-object assignment database has an assigned opening calendar. One possible format of opening calendar to alert-object assignment database is described in chapter "One exemplary embodiment". If assigned, in step 525 it will be determined as to whether or not the opening calendar has an entry in the opening calendar persistent memorabilia. If it has, in step 527 the opening flag of the alert entry will be set to the opening flag of the opening calendar persistent memorabilia entry. If the conditions above are not fulfilled, then in step 526 the opening flag of the alert entry will be set to 'open'. In next step 528 the timestamp of the alert entry will be set to actual time and then in step 529 the alert entry will be attached to the persistent alert memory.

Figure 11B:
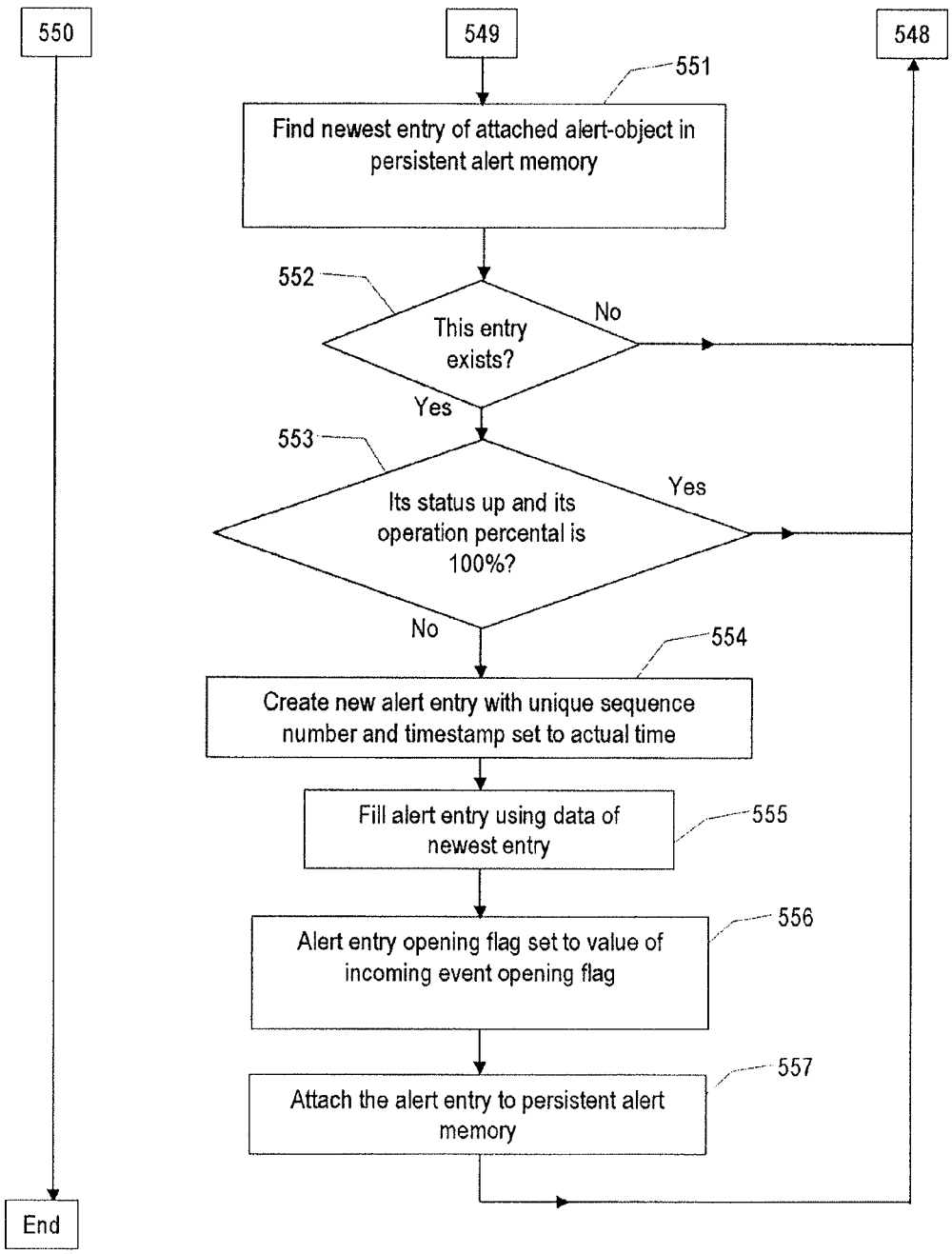

If in step 512 it is determined that the event 61 is an opening event (see FIG. 11), then in step 542 it will be determined by its identifier as to whether or not the opening calendar has an entry in the opening calendar persistent memorabilia. One possible format of opening event is described in chapter "One exemplary embodiment". If it has an entry, then in step 544 persistent memorabilia entry will be overwritten using data of the incoming event. If it has no entry, then in step 543 the entry filled up with data of the incoming event will be attached to persistent memorabilia.

In next steps 546, 545, 547 a search will be carried out for attached alert-objects in the opening calendar to alert-object assignment database filtered with an identifier of the opening calendar. One possible format of opening calendar to alert-object assignment database is described in the chapter "One exemplary embodiment". If attached, then in step 511 newest entry of attached object in persistent alert memory will be checked. If in step 552 it is determined that this entry exists, then statuses of entry will be checked. If in step 553 it is determined that its status is not operational or its percental operational status does not equal to 100%, then in step 554 a new alert entry will be created with unique sequence number and the timestamp will be set to actual time. In step 555 the alert entry will be filled using data of newest entry. In step 556 the alert entry opening flag will be set to the value of the opening flag of the incoming event. In step 557 the alert entry will be attached to persistent alert memory.

Figure 12:
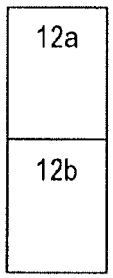
FIG. 12 is an overview of the following FIGS. 12a and 12b.
Figure 12A:
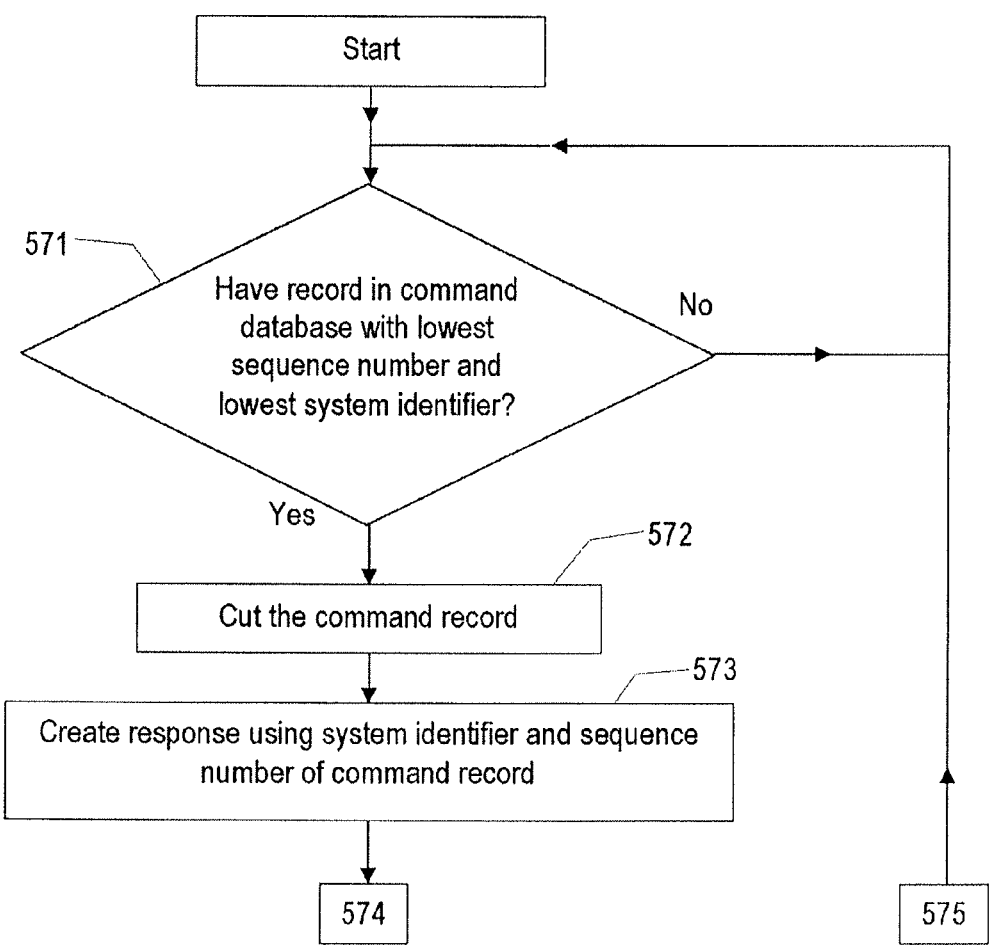
FIGS. 12a and 12b show a flowchart of a database-based application programming interface (API) handler algorithm of alert parser module.
Figure 12B:
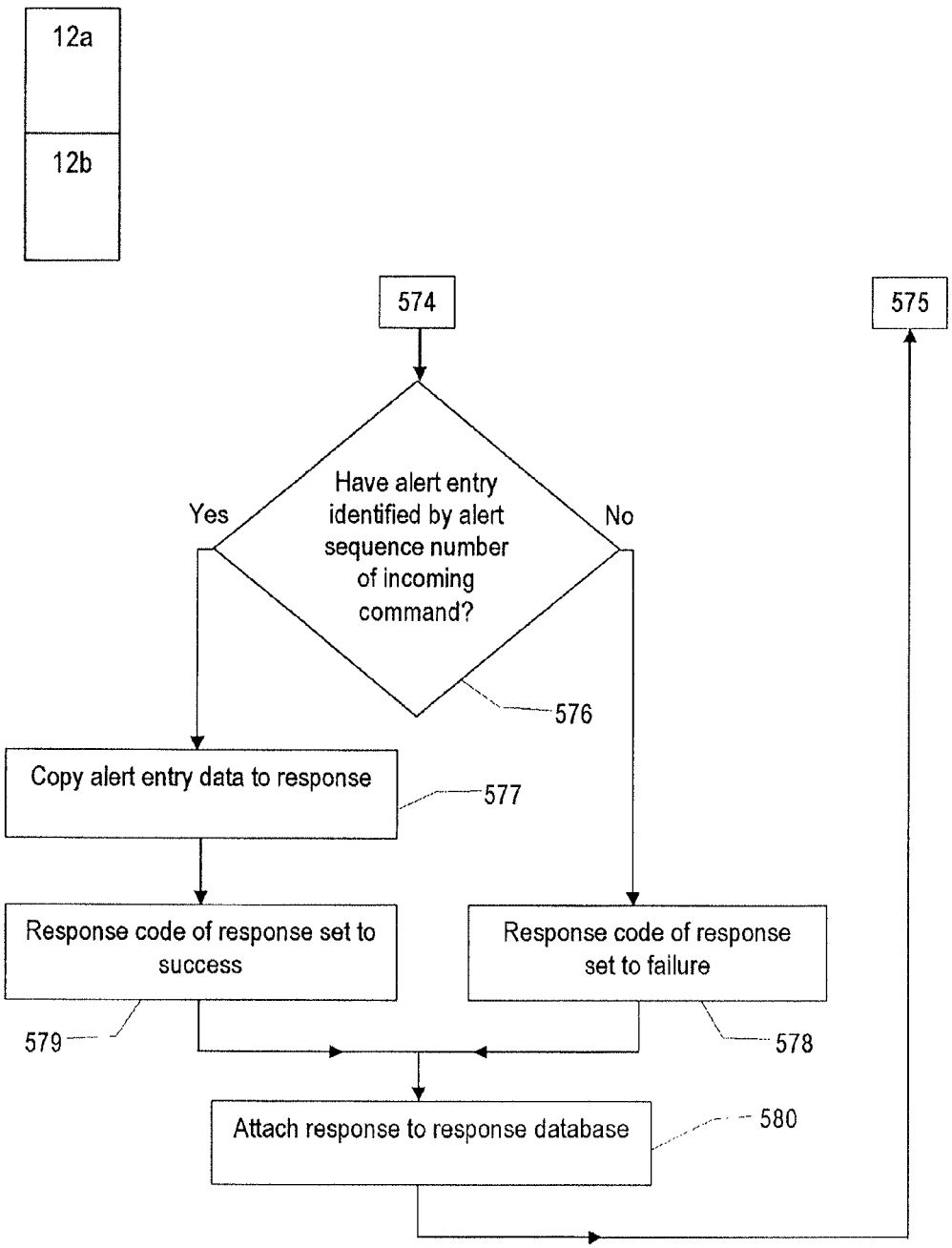
Figure 13A:
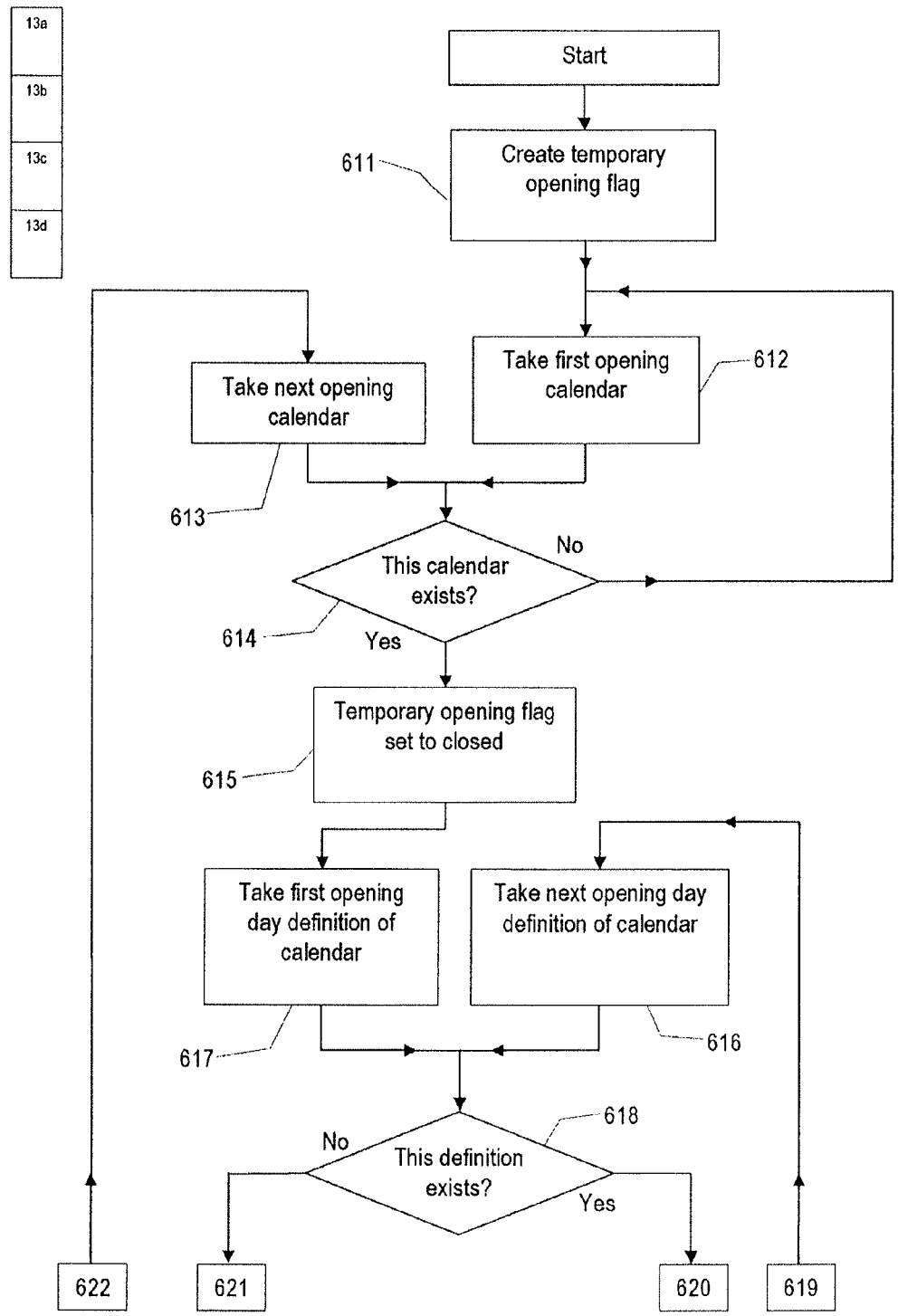
FIGS. 13a to 13d show a flowchart of an opening hours handler algorithm of the alert parser module.
Figure 13B:
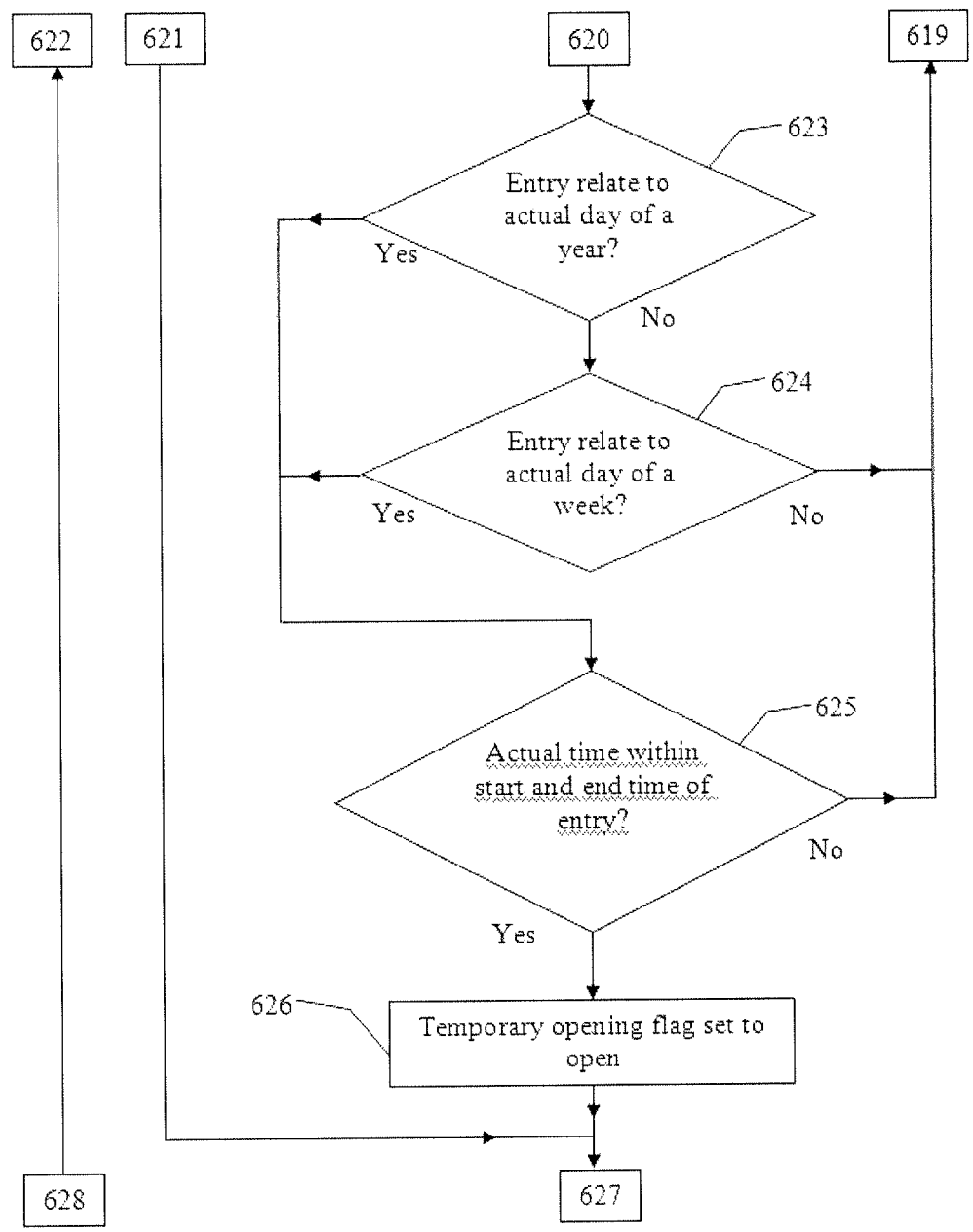
Figure 13C:
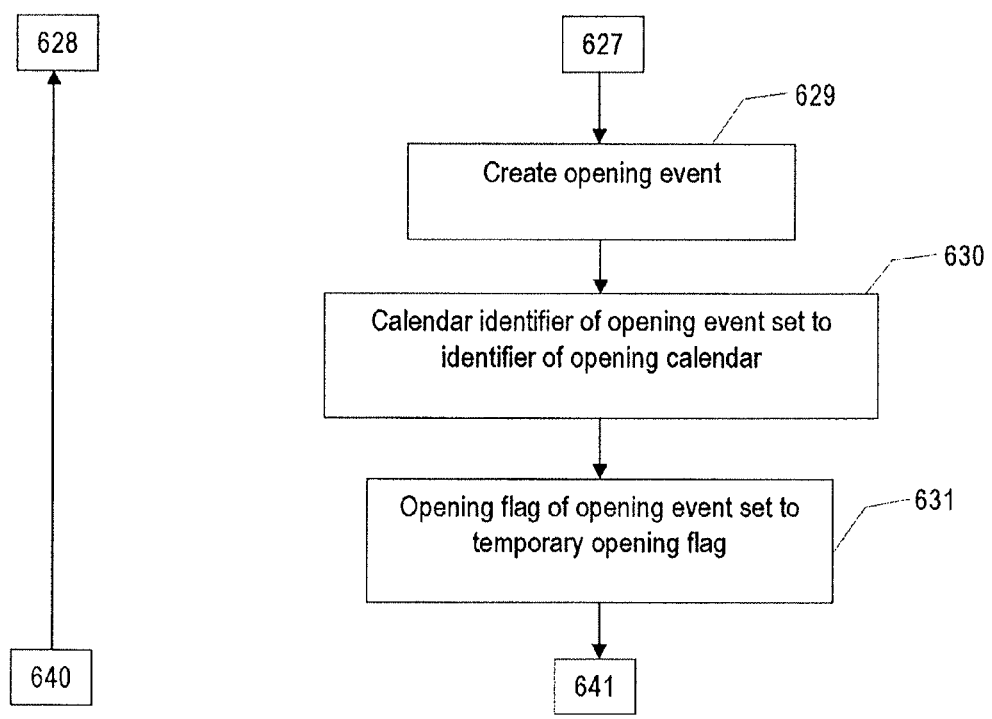
Figure 13D:
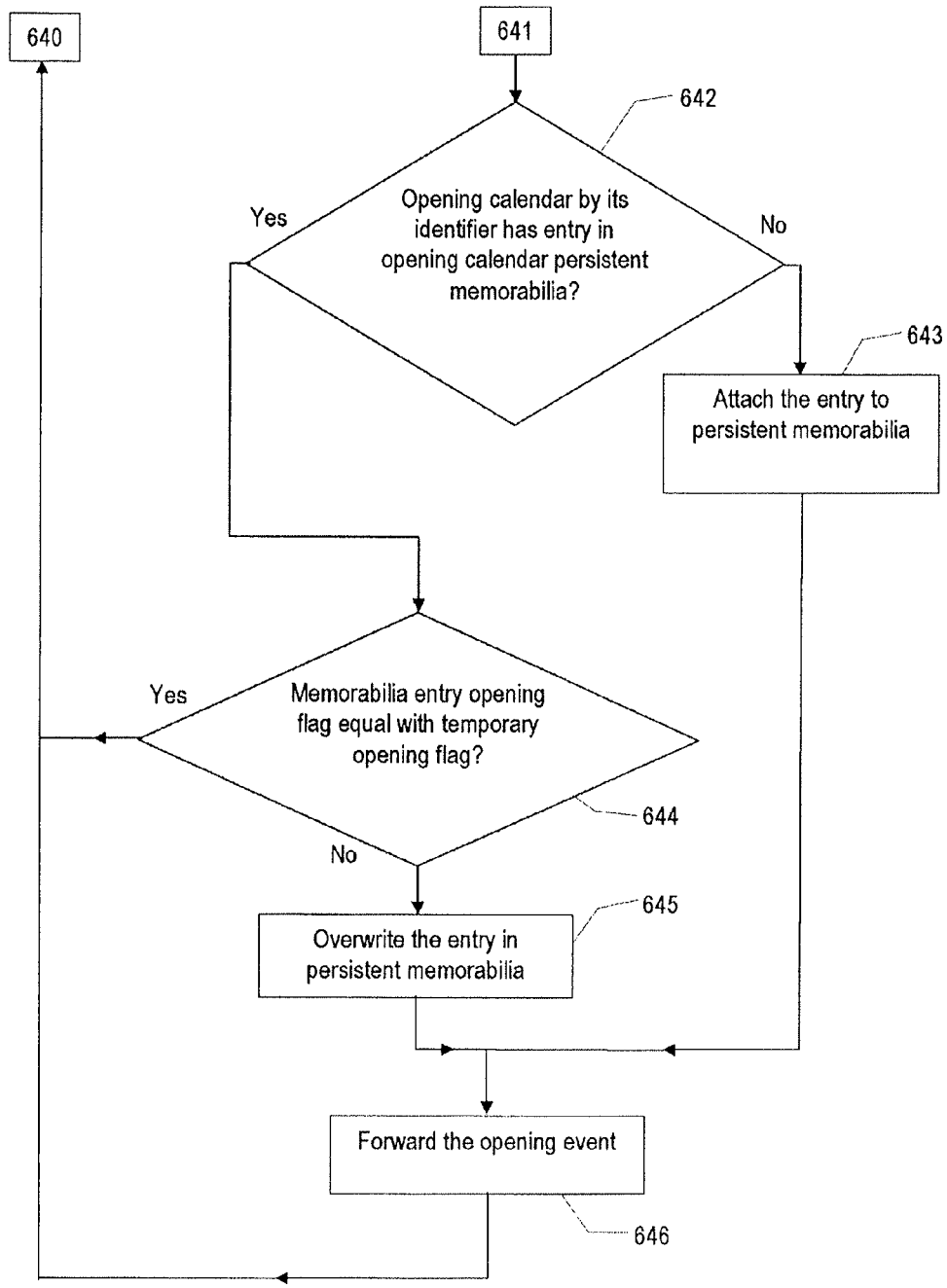

An exemplary operation of the database based application programming interface (API) 41 is illustrated by the operation of the alert parser module 4 (see FIG. 12). One possible format of database based application programming interface (API) is described in chapter "One exemplary embodiment".

In first step, a command from an external system will be placed to the command database. In step 571 it will be continuously determined in the command database of the interface 41 as to whether or not it has a record with lowest sequence number and lowest system identifier. If it has, then in step 572 the command record will be cut from database and in step 573 a response using system identifier and sequence number of command record will be created. If in step 576 it is found that the record identified by alert sequence number of incoming command exists in the persistent alert memory, then in step 577 the alert entry data will be copied to response and in step 579 the response code will be set to 'success'. If in step 576 it is determined that it does not exist, then in step 578 response code will be set to 'failure'. Finally, in step 580 the response will be attached to the response database. The external system continuously monitors the response, and at final step the response will be cut and processed.

Monitoring of opening calendars can be done e.g. by 6 separated processes in the alert parser module 4 (see FIG. 13). One possible format of opening calendar is described in chapter "One exemplary embodiment". At start of the process in step 611 a temporary opening flag will be created. In steps 612, 613, 614 all opening calendars will be processed. If a calendar exists, then in step 615 a temporary opening flag will be set to 'close'. In steps 616, 617, 618 all day definitions of calendar will be processed. If a definition exists, then in step 623 it will be determined as to whether or not it relates to actual day of a year. If not, then in step 624 it will be determined as to whether or not it relates to actual day of a week. If related either way, then in step 625 it will be determined as to whether or not actual time within start and end time of entry. If within, then 626 temporary opening flag set to 'open'. Then in step 629 an opening event will be created. One possible format of opening calendar changes event is described in chapter "One exemplary embodiment". In step 630 calendar identifier of event will be set to the identifier of the opening calendar. In step 631 the opening flag of the event will be set to the value of the temporary opening flag. In step 642 it will be determined by its identifier as to whether or not the opening calendar has an entry in opening calendar persistent memorabilia. If not, in step 643 the entry filled with data of opening calendar will be attached to opening calendar persistent memorabilia, and in step 646 the opening event 61 will be forwarded. If it has, in step 644 it will be determined as to whether or not the opening flag of entry is equal to the temporary opening flag. If not, then in step 645 the entry in the opening calendar persistent memorabilia will be overwritten using data of opening calendar, and in step 646 the opening event 61 will be forwarded.

Achievements and Advantages

One of the main objects of the present invention is to make development easy and more transparent for service-orientated event handling systems where number of event sources is large. On other hand, its structure shall ensure great advantage in increasing the processing speed and through the possibility of handling large number of services. The resulting system is capable to monitor service status and quality of service in real-time, regardless of as to whether or not one or more different types of network carry the service. The system detects and indicates probable failure causes or deteriorations in real-time. Based on result of parsing the system can intervene in order to repair failures or degradations of service.

A possible version of the proposed method wherein the event-source is known and assign-to-network and assign-toservice information will be sent, constitutes optimal solution for smaller service providers who do not wish to maintain for example provisioning database.

A possible version of the proposed method wherein event-source do not known assign-to-network and assign-to-service information thus provided by static database, optimal solution for larger service providers have existing for example provisioning database.

Two-dimensional and three-dimensional assign-to-service feature open the door to adaptation to size of providers.

Practical benefit of present invention is significantly to improve quality of service. Therefore a smaller number of service failures or degradation can occur, which can be repaired quickly.

One Exemplary Embodiment

The system implementing the method is based on framework of ITU-T recommendations describing the closest solution. Key feature is the modular implementation of the above-described system. It is capable to operate in 1-n network parser module and 1-n service parser module architecture. Their parser modules accept large number of events source types through many different protocols. It contains trouble ticket, provisioning ticket, statistic and client-server modules. Its interfaces are open based on database based application programming interface (API). It has strong processing power. The own structured static database provides precise and fast background for parsing. It is capable to accept event sources with many different protocols from many different provider, network and equipment type.

Figure 5:
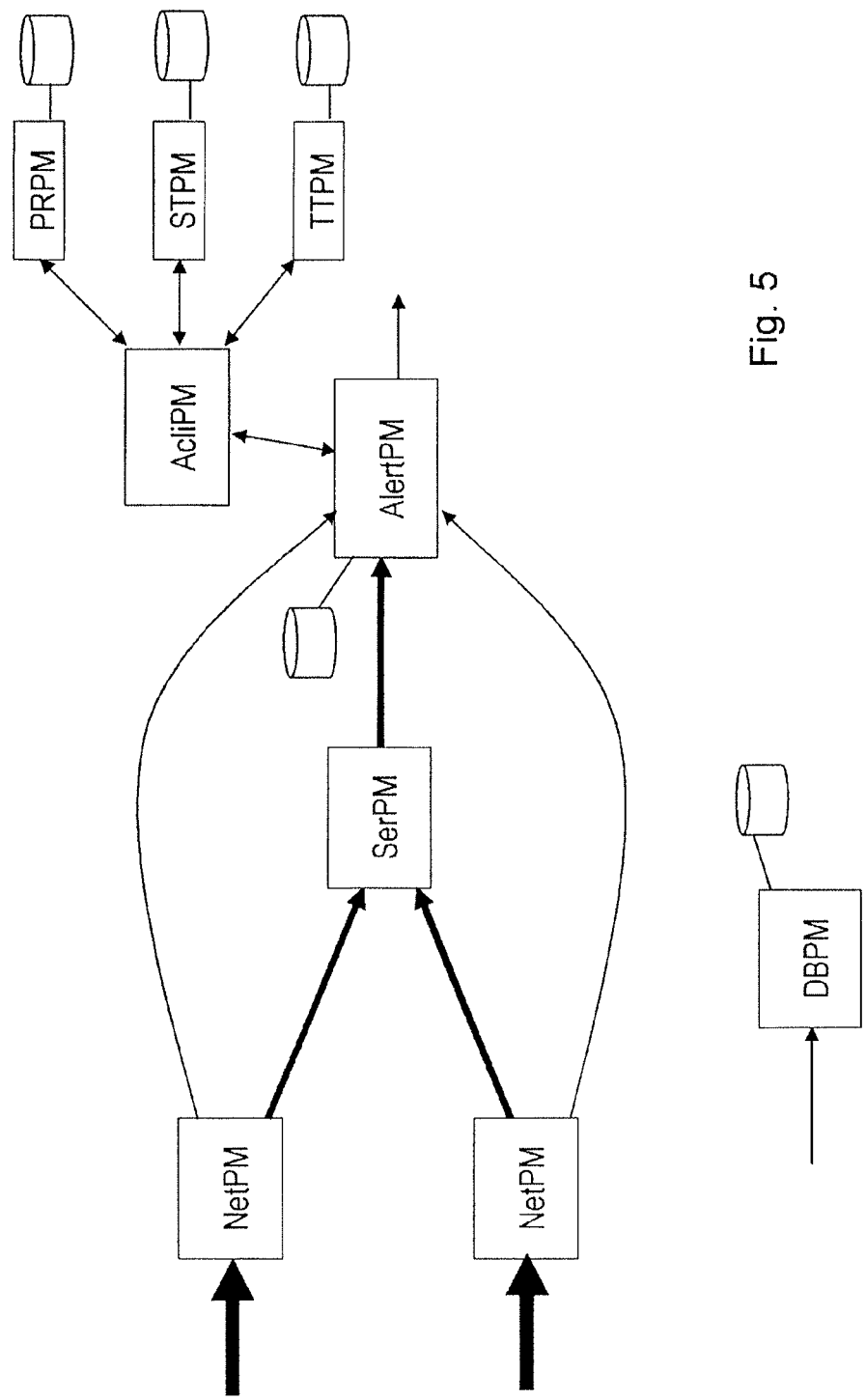
FIG. 5 is a view showing a possible implementation.

FIG. 5 sketch out structure of implemented system. The structure of basically consists to structure described by FIG. 2. Receive and conversion of events done by NetPM network parser module. Service handled by SerPM service parser module. AlertPM alert parser module responsible for storage of events. Task of DBPM database parser module is to maintain static database. Trouble tickets will be handled by a TTPM trouble ticket parser module. Responsibility of STPM statistic parser module is to make statistics. Provisioning tickets will be handled by PRPM provisioning parser module. The build-in client-server is the AcliPM alert client parser module. To help make the structure of system modular and to improve performance the core parser modules have separated persistent SQL databases. FIG. 5 shows one of the greatest practical advantages of the system, namely, a structured architecture. For this reason individual modules can be freely shared trough hardware and operating systems, for example according resource requirements.

As so called customer specific build-on system the following systems are realizable: handling systems of telecommunication utility providers, handling systems of electricity utility providers, handling systems of water utility providers, handling systems of gas utility providers, handling systems of financial providers.

Noted feature which exceeding the state of the art is handling of above systems in any combination. Therefore, by the method different type of linked provider systems, or optimal solution for providers can be served who provide different type of services.

The system based on this method can be realized in two ways. The easiest way, wherein a network object identifier contains assign-to-network and assign-to-service information. This can make the implementation simple, but prohibit for example handling of dependant object and opening time. In that case just the alert, provi, stat, trouble databases shall be implemented. FIG. 6 shows one possible way to embedding assignment information.

Identifier can be constructed by natural name of network object and extended information belonging to. Extended information is for example a reference to its bearer or its beared service. First part of identifier 141 contains assign-to-network information. This is followed by a separator character 145 then by the assign-to-service information. If the network object is a bearer of more services, then this is followed by one or more separator characters 151 and assign-to-service information 152. If the natural identifier of the network object can contain the used separator characters, then natural names must be escaped or need other separator characters are to be used.

The assign-to-network information starts with an identifier of bearer object 142 and is terminated with a separator character 143. It can be omitted if the subject object has no bearer. The next is an identifier of subject object 144 (beared by bearer object 142).

The assign-to-service information 146 starts with an identifier of beared service. This is followed by a separator then number 147 of alternate routes from aspect of service. After the separator, this is followed by a first dimension of bearer position 148 from aspect of service. After the separator, this is followed by second dimension of bearer position 149 from aspect of service. If a three-dimensional route description is used, then after the separator, this is followed by third dimension of bearer position 150 from aspect of service.

In the present implementation FIG. 5 shows the extended way, wherein the identifier of network object does not contain assign-to-network and assign-to-service information, therefore assignment-retrieval on static database is required. With eliminating static database it is easy to implement the system for such cases where the incoming event contains assign-to-service information. Present description shows implementation of 32 failure causes and 64 opening day definitions per calendar.

Elements AcliPM, PRPM, STPM, TTPM are part of the active system, but not part of the present method. Therefore, elements above are described schematically or can constitute part of other patent applications.

Every parser module (PM) is installed onto separated standard operating system run on separated standard server hardware. Parser modules connected to each other with TCP/IP protocol and using standard network devices. The protocol is fundamentally described by documents of Internet Engineering Task Force (IETF). Define the RFC768 User Datagram Protocol, RFC791 Internet Protocol, RFC792 Internet Control Message Protocol, RFC793 Transmission Control Protocol and its later versions. Assignment of IP address and hostnames illustrated by Table 3:

TABLE 3

| Parser module name | Hostname | IP address |
| --- | --- | --- |
| NetPM | netpma | 192.168.1.21 |
| NetPM | netpmb | 192.168.1.22 |
| SerPM | serpm | 192.168.1.9 |
| AlertPM | alertpm | 192.168.1.3 |
| AcliPM | aclipm | 192.168.1.11 |
| PRPM | prpm | 192.168.1.6 |
| STPM | stpm | 192.168.1.5 |
| TTPM | ttpm | 192.168.1.4 |
| DBPM | dbpm | 192.168.1.2 |
| SQL server | sqlpm | 192.168.1.12 |

Warning! At implementation IP address range must be claimed from delegated organization!

The static database server is implemented on standard SQL database server installed onto hardware and operating system of standard parser module. The query language defined at common ANSI/ISO/IEC 9075:2003 Database Language SQL recommendation by American National Standards Institute (ANSI) and International Organization for Standardization (ISO) and International Electrotechnical Commission (IEC). Databases to create are illustrated in Table 4:

ously for more external systems. The command sequence number identifies the command-request of response.

ndstatic database entry is constructed by network object pairs having dependency by state. Its reference is its identifier used in incoming event.

ndstaticdbapicmd contains fields of ndstatic table, external system identifier and command sequence number. Exter-

TABLE 4

| Database | Sql Table name | Access from parser module |
|---|---|---|
| network-to-network alert-object assignment | nstatic | all parser module |
| network-to-network alert-object assignment database based application programming interface command channel | nstaticdbapicmd | DBPM, AcliPM, external system |
| network-to-network alert-object assignment database based application programming interface response channel | nstaticdbapiack | DBPM, AcliPM, external system |
| network-to-network depend alert-object assignment | ndstatic | all parser module |
| network-to-network depend alert-object assignment database based application programming interface command channel | ndstaticdbapicmd | DBPM, AcliPM, external system |
| network-to-network depend alert-object assignment database based application programming interface response channel | ndstaticdbapiack | DBPM, AcliPM, external system |
| network-to-service alert-object assignment | sstatic | all parser module |
| network-to-service alert-object assignment database based application programming interface command channel | sstaticdbapicmd | DBPM, AcliPM, external system |
| network-to-service alert-object assignment database based application programming interface response channel | sstaticdbapiack | DBPM, AcliPM, external system |
| opening calendar | optcal | AlertPM, DBPM |
| opening calendar database based application programming interface command channel | optcaldbapicmd | DBPM, AcliPM, external system |
| opening calendar database based application programming interface response channel | optcaldbapiack | DBPM, AcliPM, external system |
| opening calendar to alert-object assignment | optcalasg | AlertPM, DBPM |
| opening calendar to alert-object assignment database based application programming interface command channel | optcalasgdbapicmd | DBPM, AcliPM, external system |
| opening calendar to alert-object assignment database based application programming interface response channel | optcalasgdbapiack | DBPM, AcliPM, external system |
| alert | alert | AlertPM, TTPM |
| alert database based application programming interface command channel | alertdbapicmd | AlertPM, AcliPM, TTPM, STPM, PRPM, external system |
| alert database based application programming interface response channel | alertdbapiack | AlertPM, AcliPM, TTPM, STPM, PRPM, external system |
| provisioning | provi | AcliPM, PRPM |
| statistic | stat | AcliPM, STPM |
| trouble ticket | trouble | AcliPM, TTPM | nstatic database entries are constructed by network object pairs which have bearer-beared relation. Its reference is its identifier used in incoming event.

nstaticdbapicmd contains fields of nstatic table, external system identifier and command sequence number. External system identifier provides capability to separate external systems. In this way it provides capability to enable loading simultaneously for more external systems. The command sequence number identifies the command-request. nstaticdbapiack contains response code field, external system identifier and command sequence number. Response code is 0 if the database operation is successful. Response code is greater than 0 if the database operation failed. In that case response code contains number of errors. External system identifier provides capability to separate external systems. In this way it provides capability to enable loading simultanenal system identifier provides capability to separate external systems. In this way provide capability to enable loading simultaneously for more external systems. The command sequence number identifies the command-request. ndstaticdbapiack contains response code field, external system identifier and command sequence number. Response code is 0 if the database operation successful. Response code is greater than 0 if the database operation failed. In that case response code contains number of errors. External system identifier provides capability to separate external systems. In this way provide capability to enable loading simultaneously for more external systems. The command sequence number identifies the command-request of response.

sstatic database entry has three fields that contain network object referred by identifier used in incoming event, the assigned service referred by its identifier and two-dimensional or three-dimensional bearer position for example coded in character string. sstaticdbapicmd contains fields of sstatic table, external system identifier and command sequence number. External system identifier provides capability to separate external systems. In this way provide capability to enable loading simultaneously for more external systems. The command sequence number identifies the command-request. sstaticdbapiack contains response code field, external system identifier and command sequence number. Response code is 0 if the database operation successful. Response code greater than 0 if the database operation failed. In that case response code contains number of errors. External system identifier provides capability to separate external systems. In this way provide capability to enable loading simultaneously for more external systems. The command sequence number identifies the command-request of response. optical database entry contains identifier of opening calendar and opening day definitions described in Table 5:

TABLE 5

| Column name | Type | Remark |
| --- | --- | --- |
| optcname | string | |
| dayref1 | integer | decoding see below |
| opstart1 | integer | decoding see below |
| opend1 | integer | decoding see below |
| dayref2 | integer | decoding see below |
| opstart2 | integer | decoding see below |
| opend2 | integer | decoding see below |
| ... | | |
| dayref64 | integer | decoding see below |
| opstart64 | integer | decoding see below |
| opend64 | integer | decoding see below |

The number at end of column name is sequence number of entry. In that example 64 opening day definitions are possible in one opening calendar. The dayref field of opening day definition specify the day related to. 1-7 mean Monday to Sunday, and −1 to −366 is out of the ordinary days (e. g. holidays) referred by day of year. The opstart specifies first time of opening referred by second of a day, the opend specifies last time of opening referred by second of a day. If in a day more non-continuous opening periods exist, then this can be described by more entries with same dayref value.

optcaldbapicmd contains fields of optcal table, external system identifier and command sequence number. External system identifier provides capability to separate external systems. In this way provide capability to enable loading simultaneously for more external systems. The command sequence number identifies the command-request. optcaldbapiack contains response code field, external system identifier and command sequence number. Response code is 0 if the database operation successful. Response code greater than 0 if the database operation failed. In that case response code contains number of errors. External system identifier provides capability to separate external systems. In this way provide capability to enable loading simultaneously for more external systems. The command sequence number identifies the command-request of response. optcalasg database entry contains identifier of alert-object and identifier of assigned opening calendar.

Remark: The AcliPM access required for object operator-access.

optcalasgdbapicmd contains fields of optcalasg table, external system identifier and command sequence number. External system identifier provides capability to separate external systems. In this way provide capability to enable loading simultaneously for more external systems. The command sequence number identifies the command-request.

optcalasgdbapiack contains response code field, external system identifier and command sequence number. Response code is 0 if the database operation successful. Response code greater than 0 if the database operation failed. In that case response code contains number of failures. External system identifier provides capability to separate external systems. In this way provide capability to enable loading simultaneously for more external systems. The command sequence number identifies the command-request of response.

The alert entry contain auto-increment sequence number, timestamp, opening flag and common event-format described in Table 6:

TABLE 6

| Column name | Type | Remark |
| --- | --- | --- |
| sequnum | long | auto increment |
| timestamp | datetime | timestamp |
| inoptime | integer | opening flag |
| name | string | |
| status | integer | decoding see below |
| opprct | integer | per tenthousand |
| name1 | string | |
| status1 | integer | decoding see below |
| opprct1 | integer | per tenthousand |
| name2 | string | |
| status2 | integer | decoding see below |
| opprct2 | integer | per tenthousand |
| ... | | |
| name32 | string | |
| status32 | integer | decoding see below |
| opprct32 | integer | per tenthousand |

The number at end of column name mark failure causes in order of relevance. The 1 is the most relevant, 2 is a next relevant, 32 is a least relevant.

Possible value of status filed described in Table 7:

TABLE 7

| Status | Name | Value |
| --- | --- | --- |
| failed | down | 0 |
| operational | up | 1 |
| administratively down | off | 2 | alertdbapicmd contains sequnum sequence number of entry to query, external system identifier and command sequence number. The sequnum sequence number provides a feature to identify requested entry. External system identifier provides capability to separate external systems. In this way it provides capability to enable loading simultaneously for more external systems. The command sequence number identifies the command-request.

alertdbapiack contains fields of alert table, response code field, external system identifier and command sequence number. The requested entry returns in fields of alert table.

Response code is 0 if the database operation successful. Response code greater than 0 if the database operation failed. In that case response code contains number of errors. External system identifier provides capability to separate external systems. In this way it provides capability to enable loading simultaneously for more external systems. The command sequence number identifies the command-request of response.

Literature to reach minimum skill level is Stolnicki Gyula: "SQL kézikönyv", Computerbooks Kiadói Kft., 1995, ISBN 9636180008.

The incoming events and communication between parser modules can be implemented using Simple Network Management Protocol (SNMP). SNMP is fundamentally described by documents of Internet Engineering Task Force (IETF).

Version 1 of protocol is defined by documents RFC 1157. Simple Network Management Protocol, the SMIv1 and MIB-II.

Version 2 of protocol is defined by documents RFC 1901. Introduction to Community-based SNMPv2, RFC 1908. Coexistence between Version 1 and Version 2 of the Internet-standard Network Management Framework, RFC 3416. Version 2 of SNMP Protocol Operations, RFC 3417. Transport Mappings, the SMIv1 and MIB-II.

Version 3 of protocol is defined by documents RFC 3410. Introduction and Applicability Statements for Internet Standard Management Framework, RFC 3411. An Architecture for Describing SNMP Management Frameworks, RFC 3412. Message Processing and Dispatching, RFC 3413. SNMP Applications, RFC 3414. User-based Security Model, RFC 3415. View-based Access Control Model, RFC 3416. Version 2 of SNMP Protocol Operations, RFC 3417. Transport Mappings, RFC 3584. Coexistence between Version 1, Version 2, and Version 3 of the Internet-standard Network Management Framework, RFC 3826. The Advanced Encryption Standard (AES) Cipher Algorithm in the SNMP User-based Security Model, RFC 5343. Simple Network Management Protocol (SNMP) Context EngineID Discovery, the SMIv1 and MIB-II.

The version 1 of Structure and Identification of Management (SMI) is described by documents RFC 1155. Structure and Identification of Management Information for TCP/IP-based internets, RFC 1212. Concise MIB Definitions, RFC 1215. Convention for Defining Traps for use with the SNMP.

The version 2 of Structure and Identification of Management (SMI) is described by documents RFC 2578. Structure of Management Information Version 2 (SMIv2), RFC 2579. Textual Conventions for SMIv2, RFC 2580. Conformance Statements for SMIv2. The Management Information Base (MIB-II) is defined by documents RFC 1213. Management Information Base for Network Management of TCP/IP-based internets: MIB-II, RFC 2863. The Interfaces Group MIB (IF), RFC 3418. Management Information Base (MIB) for the Simple Network Management Protocol (SNMP), RFC 4001. Textual Conventions for Internet Network Addresses, RFC 4022. Textual Conventions for Internet Network Addresses (TCP), RFC 4113. Management Information Base for the User Datagram Protocol (UDP), RFC 4292. IP Forwarding Table MIB (IP-FORWARD), RFC 4293. Management Information Base for the Internet Protocol (IP), RFC 4898. TCP Extended Statistics MIB (TCP-ESTATS).

In the example the communication to external systems uses SNMP trap. Version of protocol and its security options can be selected without limitation at implementation phase. At implementation the incoming protocol or protocols must be defined in MIB-II variables according to request. The procedure of determined by MIB-II documents above. Basic coding rules of example incoming event-format described in Table 8:

TABLE 8

| MIB name | OID | type | remark |
|---|---|---|---|
| enterprises.knitc.sfums.inevt | 1.35548.1.32765 | trap | |
| enterprises.knitc.sfums.inobj | 1.35548.1.32764 | trap object | |
| enterprises.knitc.sfums.inobj.name | 1.35548.1.32764.1 | string | |
| enterprises.knitc.sfums.inobj.status | 1.35548.1.32764.2 | integer | decoding see below |

Warning! At implementation OID range must be claimed from delegated organization! Possible value of status filed described in Table 9:

TABLE 9

| Status | Name | Value |
|---|---|---|
| failed | down | 0 |
| operational | up | 1 |
| administratively down | off | 2 |

In that example the communication between parser modules uses SNMP trap. Format of communication is common event-format. Version of protocol and its security options can be selected without limitation at implementation phase. At implementation the common event-format used for communication must be defined in MIB-II variables according to request. The procedure of determined by MIB-II documents above. Basic coding rules of example common event-format described in Table 10:

TABLE 10

| MIB name | OID | Type | Remark |
|---|---|---|---|
| enterprises.knitc.sfums.cmnevt | 1.35548.1.32767 | trap | |
| enterprises.knitc.sfums.cmnobj | 1.35548.1.32766 | trap object | |
| enterprises.knitc.sfums.cmnobj.name | 1.35548.1.32766.1 | string | |
| enterprises.knitc.sfums.cmnobj.status | 1.35548.1.32766.2 | integer | decoding see below |
| enterprises.knitc.sfums.cmnobj.opprct | 1.35548.1.32766.3 | integer | per tenthousand |
| enterprises.knitc.sfums.cmnobj.name1 | 1.35548.1.32766.4 | string | |
| enterprises.knitc.sfums.cmnobj.status1 | 1.35548.1.32766.5 | integer | decoding see below |
| enterprises.knitc.sfums.cmnobj.opprct1 | 1.35548.1.32766.6 | integer | per tenthousand |
| enterprises.knitc.sfums.cmnobj.name2 | 1.35548.1.32766.7 | string | |

TABLE 10-continued

| MIB name | OID | Type | Remark |
|---|---|---|---|
| enterprises.knitc.sfums.cmnobj.status2 | 1.35548.1.32766.8 | integer | decoding see below |
| enterprises.knitc.sfums.cmnobj.opprct2 | 1.35548.1.32766.9 | integer | per tenthousand |
| . . . | | | |
| enterprises.knitc.sfums.cmnobj.name32 | 1.35548.1.32766.97 | string | |
| enterprises.knitc.sfums.cmnobj.status32 | 1.35548.1.32766.98 | integer | decoding see below |
| enterprises.knitc.sfums.cmnobj.opprct32 | 1.35548.1.32766.99 | integer | per tenthousand |

Warning! At implementation OID range must be claimed from delegated organization! The number at end of column name cmnobj marks failure causes in order of relevance. 1 is the most relevant, 2 is a next relevant, 32 is a least relevant.

Possible value of status filed described in Table 11:

TABLE 11

| Status | Name | Value |
|---|---|---|
| failed | down | 0 |
| operational | up | 1 |
| administratively down | off | 2 |

Basic coding rules of opening calendar changes event described in Table 12:

TABLE 12

| MIB name | OID | Type | Remark |
|---|---|---|---|
| enterprises.knitc.sfums.optcevt | 1.35548.1.32763 | trap | |
| enterprises.knitc.sfums.optcobj | 1.35548.1.32762 | trap object | |
| enterprises.knitc.sfums.optcobj.optcname | 1.35548.1.32762.1 | string | identifier of trigger calendar |
| enterprises.knitc.sfums.optcobj.optcstatus | 1.35548.1.32762.2 | integer | decoding see below |

Warning! At implementation OID range must be claimed from delegated organization! Possible value of status filed described in Table 13:

TABLE 13

| Status | Name | Value |
|---|---|---|
| opened | open | 0 |
| closed | close | 1 |

Literature to acquire minimum skill level is Duglas E. Commer: "Internetworking with TCP/IP" Vol I, Prentice Hall, 1995, ISBN: 0-13-216987-8; Behrouz A. Forouzan: "TCP/IP Protocol Suite", McGraw-Hill Higher Education, 2000, ISBN: 0-256-24166-X; Gary R. Wright; W. Richard Stevens: "TCP/IP Illustrated, Volume 2 The implementation", Addison-Wesley Publishing Company, 1995, ISBN 0-201-63354-X.

The parser module algorithms can be implemented for example in computer language C++ using standard C++ development system. The computer language C++ defined by International Organization for Standardization (ISO) and International Electrotechnical Commission (IEC) in recommendation ISO/IEC 14882. The library of SQL database server and SNMP protocol must join the development system.

At implementation of NetPM network parser module 1 2 the principles disclosed in description and claims shall be considered. The program must contain SNMP sender, SNMP receiver and SQL interface code portion. The program receives network events 11 21 24 25 25b messages from SNMP interface code portion, and converts to common-format (if required) and process it using principle described in description and claims. The bearer-beared and depending (network-to-network) assignment will be taken from nstatic and ndstatic database through SQL interface code portion. Resulting information 12 13 22 23 will be forwarded using the principles disclosed in description and claims.

At implementation of SerPM service parser module 3 principles disclosed in description and claims shall be considered. The program must contain SNMP sender, SNMP receiver and SQL interface code portion. The program receives common-format messages 12, 22 from SNMP interface code portion, and processes it using principles disclosed in description and claims. To determine and fill probable failure causes an applicable basic method of "penetrable pipe" can be used. Assignment database structure looks like pipe with tap, independently from technology type, and applicable for example for water, electricity or telecommunication service. If there is no any alternative route, then we provide service using only one pipe. If there is an alternative route, then we provide service using two or more pipes. If failure or degradation occurs anywhere in technology, then this is like turn off the tap. This way it will affect the service. Therefore, just need to list all tap which turned off as failure cause. The received common-format messages 12, 22 will be stored to status memorabilia memory. Statuses of service bearers will be taken from status memorabilia memory. If no entry exists in memorabilia, then it is assumed that its status is operational. The network-to-service assignment will be retrieved from sstatic database through SQL interface code portion. Resulting information 31 will be forwarded using the principles disclosed in description and claims.

At implementation of AlertPM alert parser module 4, 6 the principles disclosed in description and claims shall be considered. The program must contain SNMP sender, SNMP receiver and SQL interface code portion. The program 4 receives common-format event 31, 13, 23 messages from SNMP interface code portion, and process it using principles disclosed in description and claims. Resulting information will be forwarded using principles disclosed in description and claims through SQL interface code portion to alert database. The program receives requests from alertdbapicmd database 41 based application programming interface command channel, then search the requested entry in alert database, and finally respond to alertdbapiack database 41 based application programming interface response channel. It has to be noted that if security requirements allow it, then the alert database can be queried directly using SQL query. As remark, data of database based application programming interface or result of direct query can be inserted to web page and displayed using standard webserver. At processing of opening calendar events 61 principles disclosed in description and claims shall be considered. The program receives opening calendar events 61 and stores to opening memorabilia memory. The program must contain an opening calendar handler 6 code portion, which based on optical database and actual time continuously monitors opening calendar status changes. If any change occurs, then it sends an opening event 61 to the main handler program 4.

At implementation of DBPM database parser module 5 must take principle described in description and claims. The program must contain SQL interface code portion.

The program receives requests from 51 nstaticdbapicmd database based application programming interface command channel, then do check (for example to prevent duplication), and then put its data to nstatic database, and finally respond to 51 nstaticdbapiack database based application programming interface response channel.

The program receives requests from 51 ndstaticdbapicmd database based application programming interface command channel, then do check (for example to prevent duplication), and then put its data to ndstatic database, and finally respond to 51 ndstaticdbapiack database based application programming interface response channel.

The program receives requests from 51 sstaticdbapicmd database based application programming interface command channel, then do check (for example to prevent duplication), and then put its data to sstatic database, and finally respond to 51 sstaticdbapiack database based application programming interface response channel.

The program receives requests from 51 optcaldbapicmd database based application programming interface command channel, then do check (for example to prevent duplication), and then put its data to optcal database, and finally respond to 51 optcaldbapiack database based application programming interface response channel.

The program receives requests from 51 optcalasgdbapicmd database based application programming interface command channel, then do check (for example to prevent duplication), and then put its data to optcalasg database, and finally respond to 51 optcalasgdbapiack database based application programming interface response channel. Literature to acquire minimum skill level is Thomas Plum: "Learning to program in C", Prentice Hall Inc., 1983, ISBN-10: 0911537082; Benkó Tiborné Poppe András; Benkó László: "Bevezetés a Borland C++ Programozásba", ComputerBooks Kiadói Kft., 1991, ISBN: 9637642048; Benkó Tiborné; Poppe András; Benkó László: "Objektumorientált programozás C++ nyelven", ComputerBooks Kiadói Kft., 1997, ISBN: 9636181578; Angster Erzsébet: "Az objektumorientált tervezés es programozás alapjai", Angster Erzsébet, 1998, ISBN: 9636508186.

It should be emphasised that because of the flexibility and modularity of method the elements of implementation can be chosen on a large scale. Running hardware of parser module can be standard server or embedded module. Because the modular structure the parser modules can be implemented in from of program or rule, in software, firmware or hardware, or in any combination thereof. The parser modules can be shared among hardware and operating systems without limitation. The number of parser modules can be extended flexibly according to the requirements, and their operation can be shared among parser modules. The communication between parser modules moves on a large scale, for example, it can be any standardized or specialized protocol. The static and dynamic data can be handled or stored in advanced object orientated form.

It should be emphasised that this is just one possible example for demonstration of a possible operation of the method according to the invention. Based on the disclosed method, a person skilled in the art can adapt at own implementation future systems which not yet exist. Countless systems can be adaptable to this method. Description of most adaptation is not possible, on the one hand because the connecting protocol is part of a trade secret, on the other hand because it does not exist yet, thus can be an object of a patent specification or a product in the future.

Finally it should be emphasised that is not object of these methods to ensure adaptation of only one particular or determined network or co-system. Object of these methods is to make possible to adapt, receive data of all kind of one or more co-system including systems which not yet exist.

Using industrial simile, the invention discloses methods for implementing a production line associated with industrial robots, where incoming raw material and outgoing final product should be specified just at phase of assembling of production line.

The invention claimed is:

1. A method of implementing a dynamic service-event management system, comprising the steps of describing assigned service by describing the position of an event source within bearers of the service as a two-dimensional route description, wherein a route constitutes the first dimension and an element within the route constitutes the second dimension, or as a three-dimensional route description, wherein a route constitutes the first dimension, an element within the route constitutes the second dimension and the bearer of the element within the route constitutes the third dimension;

projecting of one or more events affecting status and/or quality of a service onto said service in two steps by using a common-format event type, in the first step, converting an event (11, 21, 24) originating from an external source in a network parser module (1, 2) to a common-format event including an identifier of the source of the incoming event (11, 21, 24) as an event source identifier, a status generated by the incoming event information as a status, an operational status generated by an incoming event information expressed in percentage, an identifier of the incoming event source as a failure cause expressed in common-format, in the second step, by processing the resulting common-format event (12, 22) in a service parser module (3), where the common-format event comprising the event source identifier, the status carried by the event, the number defining the operational status expressed in percentage, the failure causes expressed in common-format;

obtaining assigned service and the position of the event source within the bearers of the service from the event source identifier with the aid of the two-dimensional or three-dimensional route description between bearers of the service;

projecting the information carried by the common-format event (12, 22) onto said service by determining a number of operational routes based on the received common-format event (12, 22) and stored status of the bearers of the service, then based on the above;

deciding the status of service is operational if there is an operational route, else deciding the status of service is faulty;

determining the operational status of the service expressed as a numerical ratio of operational routes and faulty routes in percentage;

determining that the failure cause of the service are the failure causes of faulty routes;

storing the common-format event (12, 22) comprising actual status of bearer in a memorabilia.

2. The method of claim 1 further comprising the step of performing of a function "failure cause of the failure cause" by using a common-format event in such a way that, if the event source being not the failure cause per se just affected by it, then indicating a real failure cause object and the event source in a multi element failure cause variable of the common-format event and obtaining relationships between the network objects from the event source identifier.

3. The method of claim 1, further comprising the step of persistently storing of common-format events (13, 31, 23) for e.g. retrieval or processing.

4. The method of claim 1, further comprising the step of making the data of persistently stored common-format events and the static database comprising assign-to-service and assign-to-network information accessible for other connected systems via a database based application programming interface (API) (41, 51) wherein said bidirectional interface is represented by a command database table and a response database table, and further comprising for issuing a command, entering one line in the command database and transmitting the command, monitoring, receiving, interpreting and executing the command, sending a response through said response database table, wherein formats of command and response are defined by the respective database table.

5. The method of claim 1, wherein the step of obtaining the assigned service, then the position of the event source within the bearers of the service based on the event source identifier by assignment-retrieval with the aid of a static database comprising all alert-objects affecting the service and defining the interrelations in a table with the aid of two-dimensional or three-dimensional referencing between bearers of service.

6. The method of claim 5, further comprising the steps of handling of predefined opening hours by an opening calendar, creating a common opening calendar for alert-objects having same opening hours, monitoring the calendar and at opening hour changes sending a related opening event to related parser modules and effectuating the changes to related alert-objects.

7. The method of claim 5, further comprising the step of performing of a function "failure cause of the failure cause" by using a common-format event in such a way that, if the event source being not the failure cause per se just affected by it, then indicating a real failure cause object and the event source in a multi element failure cause variable of the common-format event and obtaining relationships between the network objects from a static database containing all alert-objects affecting each other.

8. The method of claim 5, further comprising the step of persistently storing of common-format events (13, 31, 23) for e.g. retrieval or processing.

9. The method of claim 5, further comprising the step of making the data of persistently stored common-format events and the static database comprising assign-to-service and assign-to-network information accessible for other connected systems via a database based application programming interface (API) (41, 51) wherein said bidirectional interface is represented by a command database table and a response database table, and further comprising for issuing a command, entering one line in the command database and transmitting the command, monitoring, receiving, interpreting and executing the command, sending a response through said response database table, wherein formats of command and response are defined by the respective database table.

\* \* \* \* \*